(12) United States Patent
Kamali et al.

(10) Patent No.: US 10,488,651 B2
(45) Date of Patent: Nov. 26, 2019

(54) TUNABLE ELASTIC DIELECTRIC METASURFACE LENSES

(71) Applicant: CALIFORNIA INSTITUTE OF TECHNOLOGY, Pasadena, CA (US)

(72) Inventors: Seyedeh Mahsa Kamali, Arcadia, CA (US); Ehsan Arbabi, Arcadia, CA (US); Amir Arbabi, Sunderland, MA (US); Yu Horie, Pasadena, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 30 days.

(21) Appl. No.: 15/948,677

(22) Filed: Apr. 9, 2018

(65) Prior Publication Data

US 2018/0292644 A1 Oct. 11, 2018

Related U.S. Application Data

(60) Provisional application No. 62/483,554, filed on Apr. 10, 2017.

(51) Int. Cl.
*G02B 26/08* (2006.01)
*G02B 1/00* (2006.01)
*G02B 5/02* (2006.01)
*G02B 1/04* (2006.01)

(52) U.S. Cl.
CPC ......... *G02B 26/0875* (2013.01); *G02B 1/002* (2013.01); *G02B 5/0242* (2013.01); *G02B 5/0268* (2013.01); *G02B 1/04* (2013.01)

(58) Field of Classification Search
CPC ........ B82Y 20/00; G02B 6/1225; G02B 1/04; G02B 26/001; G02F 2202/022
USPC ........................................................ 359/321
See application file for complete search history.

(56) References Cited

U.S. PATENT DOCUMENTS

| 8,830,556 B2 * | 9/2014 | Smith .................... B82Y 20/00 250/505.1 |
| 8,994,059 B2 | 3/2015 | Huh et al. |
| 9,054,424 B1 | 6/2015 | Hunt et al. |
| 9,385,435 B2 | 7/2016 | Bily et al. |

(Continued)

FOREIGN PATENT DOCUMENTS

| WO | 1020140113553 A | 9/2014 |
| WO | 2015/063762 A1 | 5/2015 |

(Continued)

OTHER PUBLICATIONS

Aieta, F., et al., "Aberrations of Flat Lenses and Aplanatic Metasurfaces." *Optics Express* 21(25), 31530-31539 (2013).

(Continued)

*Primary Examiner* — Mohammed A Hasan
(74) *Attorney, Agent, or Firm* — Steinfl + Bruno, LLP

(57) ABSTRACT

Metasurfaces comprise an array of meta-atoms in a stretchable polymer. The dimensions and shapes of the meta-atoms and the spacing are varied to obtain desired optical properties. Any optical wavefront, for different wavelengths, illumination angles, and polarization states can be designed with proper design of the meta-atoms. As the metasurface is stretched, the distance between the meta-atoms changes, modifying the optical response, while the dimensions of the meta-atoms remains constant.

17 Claims, 14 Drawing Sheets

(56) References Cited

U.S. PATENT DOCUMENTS

| | | | |
|---|---|---|---|
| 9,448,305 | B2 | 9/2016 | Bowers et al. |
| 9,450,310 | B2 | 9/2016 | Bily et al. |
| 9,482,796 | B2 | 11/2016 | Arbabi et al. |
| 9,507,064 | B2 | 11/2016 | Brongersma et al. |
| 9,618,680 | B2 | 4/2017 | Baker et al. |
| 9,658,469 | B2 | 5/2017 | Pugh et al. |
| 9,711,852 | B2 | 7/2017 | Chen et al. |
| 9,733,545 | B2 | 8/2017 | Belkin et al. |
| 9,806,414 | B2 | 10/2017 | Chen et al. |
| 9,806,415 | B2 | 10/2017 | Chen et al. |
| 9,806,416 | B2 | 10/2017 | Chen et al. |
| 9,812,779 | B2 | 11/2017 | Chen et al. |
| 9,995,859 | B2 | 6/2018 | Kamali et al. |
| 9,995,930 | B2 * | 6/2018 | Arbabi ............... G02B 27/0031 |
| 10,199,415 | B2 * | 2/2019 | Akselrod ......... B29D 11/00326 |
| 10,267,956 | B2 | 4/2019 | Arbabi et al. |
| 10,267,957 | B2 | 4/2019 | Kamali et al. |
| 2003/0169504 | A1 | 9/2003 | Kaminsky et al. |
| 2003/0170442 | A1 | 9/2003 | Kaminsky et al. |
| 2003/0175004 | A1 | 9/2003 | Garito et al. |
| 2003/0176777 | A1 | 9/2003 | Muller-Dethlefs |
| 2005/0062928 | A1 | 3/2005 | Yau et al. |
| 2005/0203364 | A1 | 9/2005 | Monfre et al. |
| 2006/0176471 | A1 | 8/2006 | Hendriks |
| 2006/0250613 | A1 | 11/2006 | Demuth et al. |
| 2006/0276713 | A1 | 12/2006 | Maier |
| 2007/0019306 | A1 | 1/2007 | Wu et al. |
| 2007/0060806 | A1 | 3/2007 | Hunter et al. |
| 2008/0161194 | A1 | 7/2008 | Turner et al. |
| 2008/0186483 | A1 | 8/2008 | Kiesel et al. |
| 2008/0219027 | A1 | 9/2008 | Bourdelais et al. |
| 2009/0250110 | A1 | 10/2009 | Yu et al. |
| 2010/0252721 | A1 | 10/2010 | Xu |
| 2011/0105867 | A1 | 5/2011 | Schultz et al. |
| 2011/0141541 | A1 | 6/2011 | Bratkovski |
| 2011/0210459 | A1 | 9/2011 | Bille |
| 2012/0038915 | A1 | 2/2012 | Tsuchida et al. |
| 2012/0082863 | A1 | 4/2012 | Ohta et al. |
| 2012/0113419 | A1 | 5/2012 | Wang et al. |
| 2013/0208332 | A1 | 8/2013 | Yu et al. |
| 2013/0337436 | A1 | 12/2013 | Toury et al. |
| 2014/0085693 | A1 | 3/2014 | Mosallaei et al. |
| 2014/0124033 | A1 * | 5/2014 | Dimitrakopoulos .... G06F 3/061 136/256 |
| 2014/0146390 | A1 | 5/2014 | Kaempfe et al. |
| 2014/0167022 | A1 | 6/2014 | Huh et al. |
| 2014/0264998 | A1 | 9/2014 | Smith et al. |
| 2014/0277433 | A1 | 9/2014 | Pugh et al. |
| 2014/0277436 | A1 | 9/2014 | Pugh et al. |
| 2015/0117032 | A1 | 4/2015 | Hu et al. |
| 2015/0124480 | A1 | 5/2015 | Baker et al. |
| 2015/0219806 | A1 | 8/2015 | Arbabi et al. |
| 2015/0255876 | A1 | 9/2015 | Volpe |
| 2015/0309218 | A1 | 10/2015 | Shalaev et al. |
| 2015/0323385 | A1 | 11/2015 | Han et al. |
| 2016/0025914 | A1 | 1/2016 | Brongersma et al. |
| 2016/0041095 | A1 | 2/2016 | Rothberg et al. |
| 2016/0299337 | A1 | 10/2016 | Arbabi et al. |
| 2016/0306079 | A1 | 10/2016 | Arbabi et al. |
| 2016/0313477 | A1 | 10/2016 | Orenstein et al. |
| 2016/0320531 | A1 | 11/2016 | Kamali et al. |
| 2017/0010483 | A1 | 1/2017 | Fainman et al. |
| 2017/0030773 | A1 | 2/2017 | Han et al. |
| 2017/0045652 | A1 | 2/2017 | Arbabi et al. |
| 2017/0097558 | A1 | 4/2017 | Belkin et al. |
| 2017/0188901 | A1 | 7/2017 | Faraon et al. |
| 2017/0195652 | A1 | 7/2017 | Du et al. |
| 2017/0195659 | A1 | 7/2017 | Du et al. |
| 2017/0212285 | A1 | 7/2017 | Arbabi et al. |
| 2017/0250577 | A1 | 8/2017 | Ho et al. |
| 2017/0351111 | A1 | 12/2017 | Jeong et al. |
| 2018/0006376 | A1 | 1/2018 | Black et al. |
| 2018/0042527 | A1 | 2/2018 | Rawicz et al. |
| 2018/0275321 | A1 | 9/2018 | Kamali et al. |

FOREIGN PATENT DOCUMENTS

| | | |
|---|---|---|
| WO | 2016/140720 A2 | 9/2016 |
| WO | 2016/168173 A1 | 10/2016 |
| WO | 2016/171962 A1 | 10/2016 |
| WO | 2017/034995 A1 | 3/2017 |
| WO | 2017/176343 A2 | 10/2017 |
| WO | 2017/176921 A1 | 10/2017 |

OTHER PUBLICATIONS

Aieta, F., et al., "Aberration-Free Ultrathin Flat Lenses and Axicons at Telecom Wavelengths Based on Plasmonic Metasurfaces." *Nano Letters* 12, 4932-4936 (2012).

Aieta, F., et al., "Multiwavelength Achromatic Metasurfaces by Dispersive Phase Compensation." *Science* 347, 1342-1345 (2015). 5 pages.

Arbabi, A., et al., "Complete Control of Polarization and Phase of Light with High Efficiency and Sub-wavelength Spatial Resolution." arXiv:1411.1494, [physics.optics] (2014). 10 pages.

Arbabi, A., et al., "Controlling the Phase Front of Optical Fiber Beams using High Contrast Metastructures." *CLEO* (2014). 2 pages.

Arbabi, A., et al., "Dielectric Metasurfaces for Complete Control of Phase and Polarization with Subwavelength Spatial Resolution and High Transmission." *Nature Nanotechnology* 10, 937-943 (2015). 28 pages.

Arbabi, A., et al., "Efficient High NA Flat Micro-Lenses Realized Using High Contrast Transmitarrays," *Proc. SPIE* (2015). 7 pages.

Arbabi, A. et al., "Fundamental Limits of Ultrathin Metasurfaces." arXiv:1411.2537 (2014). 6 pages.

Arbabi, A., et al., "Highly Efficient Polarization Control Using Subwavelength High Contrast Transmitarrays." *Proc. SPIE* (2015). 7 pages.

Arbabi, A., et al., "Miniature Optical Planar Camera Based on a Wide-Angle Metasurface Doublet Corrected for Monochromatic Aberrations." *Nature Communications* 7:13682 (2016). 9 pages.

Arbabi, E., et al., "Multiwavelength Polarization-Insensitive Lenses Based on Dielectric Metasurfaces with Meta-Molecules." *Optica* 3, 628-633 (2016).

Arbabi, A., et al., "Subwavelength-Thick Lenses with High Numerical Apertures and Large Efficiency Based on High Contrast Transmitarrays." arXiv:1410.8261 [physics.optics] (2014). 10 pages.

Arbabi, A., et al., "Subwavelength-Thick Lenses with High Numerical Apertures and Large Efficiency Based on High-Contrast Transmitarrays." *Nature Communications* 6:7069 (2015). 6 pages.

Astilean, S., et al., "High-Efficiency Subwavelength Diffractive Element Patterned in a High-Refractive-Index Material for 633 nm." *Optics Letters* 23, 552-554 (1998). 4 pages.

Bennett, S. J. "Achromatic Combinations of Hologram Optical Elements." *Applied Optics* 15, 542-545 (1976).

Buralli, D. A., et al., "Some Fundamental Limitations of Achromatic Holographic Systems." *J. Opt. Soc. Am. A* 6(12), 1863-1868 (1989).

Chen, Y., et al., "Engineering the Phase Front of Light with Phase-Change Material Based Planar Lenses," *Scientific Reports* 5:8660 (2015). 7 pages.

Cheng, J., et al., "Truly Achromatic Optical Metasurfaces: A Filter Circuit Theory-Based Design." *Journal of the Optical Society of America B* 32, 2115-2121 (2015). 8 pages.

Chong, K. E., et al., "Polarization-Independent Silicon Metadevices for Efficient Optical Wavefront Control." *Nano Letters* 15, 5369-5374 (2015). 25 pages.

Decker, M. et al. "High-Efficiency Dielectric Huygens' Surfaces." *Advanced Optical Materials* 3, 813-820 (2015).

Di Falco, A., et al., "Flexible Metamaterials at Visible Wavelengths." *New Journal of Physics* 12:113006 (2010). 8 pages.

Donner, J. S., et al., "Fast and Transparent Adaptive Lens Based on Plasmonic Heating." *ACS Photonics* 2, 355-360 (2015).

Eisenbach, O., et al., "Metasurfaces Based Dual Wavelength Diffractive Lenses." *Optics Express* 23, 3928-3936 (2015).

Ergin, T., et al., "Three-Dimensional Invisibility Cloak at Optical Wavelengths." *Science* 328, 337-339 (2010). 4 pages.

(56) References Cited

OTHER PUBLICATIONS

Faklis, D., et al., "Spectral Properties of Multiorder Diffractive Lenses." *Applied Optics* 34(14), 2462-2468 (1995).
Fan, P. et al. "An Invisible Metal-Semiconductor Photodetector." *Nature Photonics* 6, 380-385 (2012).
Fattal, D., et al., "Flat Dielectric Grating Reflectors with Focusing Abilities." *Nature Photonics* 4, 466-470 (2010). 5 pages.
Gutruf, P., et al., "Mechanically Tunable Dielectric Resonator Metasurfaces at Visible Frequencies." *ACS Nano.* 10, 133-141 (2016). 30 pages.
He, J., et al., "Inorganic Materials and Assembly Techniques for Flexible and Stretchable Electronics." *Proc. IEEE* 103, 619-632 (2015).
Holo/Or, The Early Pioneer of Diffractive Optics Since 1989, Tahei Boeki Co Ltd.
Huang, Y.-W., et al., "Gate-Tunable Conducting Oxide Metasurfaces." *Nano Letters* 16, 5319-5325, arXiv:1511.09380 preprint (2015). 13 pages.
Jahani, S., et al., "All-Dielectric Metamaterials." *Nature Nanotechnology* 11, 23-36 (2016).
Kamali, S. M., et al., "Highly Tunable Elastic Dielectric Metasurface Lenses." *Laser & Photonics Reviews* 10(6), 1002-1008, arXiv:1604.03597 (2016). 7 pages.
Kamali, S. M., et al., "Decoupling Optical Function and Geometrical Form Using Conformal Flexible Dielectric Metasurfaces." *Nature Communications* 7:11618 (2016). 7 pages.
Karimi, E. et al. "Generating Optical Orbital Angular Momentum at Visible Wavelengths Using a Plasmonic Metasurface." *Light: Science & Applications* 3, e167 (2014). 4 pages.
Khorasaninejad, M. et al. "Achromatic Metasurface Lens at Telecommunication Wavelengths." *Nano Letters* 15, 5358-5362 (2015).
Kildishev, A. V., et al., "Planar Photonics with Metasurfaces." *Science* 339, 1232009 (2013). 9 pages.
Knapp, D. J. "Fundamentals of Conformal Dome Design." *Proc. SPIE* 4832, 394-409 (SPIE, 2002).
Koenderink, A. F., et al., "Nanophotonics: Shrinking Light-Based Technology." *Science* 348, 516-521 (2015).
Lalanne, P., et al., "Blazed Binary Subwavelength Gratings with Efficiencies Larger than Those of Conventional Echelette Gratings." *Optics Letters* 23, 1081-1083 (1998). 4 pages.
Lalanne, P., et al., "Design and Fabrication of Blazed Binary Diffractive Elements with Sampling Periods Smaller than the Structural Cutoff." *J. Opt. Soc. Am. A* 16, 1143-1156 (1999).
Lalanne, P. "Waveguiding in Blazed-Binary Diffractive Elements." *J. Opt. Soc. Am. A* 16, 2517-2520 (1999). 5 pages.
Latta, J. N. "Analysis of Multiple Hologram Optical Elements with Low Dispersion and Low Aberrations." *Applied Optics* 11, 1686-1696 (1972).
Lee, J. et al., "Giant Nonlinear Response from Plasmonic Metasurfaces Coupled to Intersubband Transitions." *Nature* 511, 65-69 (2014). 11 pages.
Li, X., et al., "Tunable Binary Fresnel Lens Based on Stretchable PDMS/CNT Composite," in "*Solid-State Sensors, Actuators and Microsystems (Transducers), 2015 Transducers—2015 18th International Conference on IEEE*," 2041-2044 (2015).
Lin, D., et al., "Dielectric Gradient Metasurface Optical Elements." *Science* 345, 298-302 (2014). 6 pages.
Liu, V., et al., "S4: A Free Electromagnetic Solver for Layered Periodic Structures." *Computer Physics Communications* 183, 2233-2244 (2012).
Ni, X., et al., "Ultra-Thin, Planar, Babinet-Inverted Plasmonic Metalenses." *Light: Science & Applications* 2, e72 (2013). 6 pages.
Ni, X., et al., "An Ultrathin Invisibility Skin Cloak for Visible Light." *Science* 349, 1310-1314 (2015). 6 pages.
Oskooi, A. F. et al. "Meep: A Flexible Free-Software Package for Electromagnetic Simulations by the FDTD Method." *Computer Physics Communications* 181, 687-702 (2010). 30 pages.
Pelrine, R., et al., "High-Speed Electrically Actuated Elastomers with Strain Greater Than 100%." *Science* 287, 836-839 (2000).
Piggott, A.Y., et al., "Inverse Design and Demonstration of a Compact and Broadband On-Chip Wavelength Demultiplexer." *Nature Photonics* 9, 374-377 (2015). 5 pages.
Pryce, I. M., et al., "Highly Strained Compliant Optical Metamaterials with Large Frequency Tunability." *Nano Letters* 10, 4222-4227 (2010).
Rogers, J. A., et al., "Materials and Mechanics for Stretchable Electronics," *Science* 327, 1603-1607 (2010).
Sauvan, C., et al., "Broadband Blazing with Artificial Dielectrics." *Optics Letters* 29, 1593-1595 (2004). 4 pages.
Simonov, A.N., et al., "Light Scanner Based on a Viscoelastic Stretchable Grating." *Optics Letters* 30, 949-951 (2005).
Shannon, R. R. Overview of Conformal Optics. *Proc. SPIE 3705, Window and Dome Technologies and Materials VI*, in AeroSense'99, 180-188 (1999). 11 pages.
Shao, J.W., et al., "In Vivo Blood Glucose Quantification Using Raman Spectroscopy." *Plos One*, 7(10), e48127 (2012). 6 pages.
Swanson, G. J. "Binary Optics Technology: The Theory and Design of Multi-level Diffractive Optical Elements." *Technical Report 854, DTIC Document* (1989). 53 pages.
Sweatt, W. C. "Achromatic Triplet Using Holographic Optical Elements." *Applied Optics* 16, 1390-1391 (1977).
Teo, J. Y. H., et al., "Controlling Electromagnetic Fields at Boundaries of Arbitrary Geometries." *Physical Review A* 94, 023820, arXiv:1509.06175, (2015). 11 pages.
Thompson, K. P., et al., "Freeform Optical Surfaces: A Revolution in Imaging Optical Design." *Optics & Photonics News* 23, 30-35 (2012).
Valentine, J., et al., "An Optical Cloak Made of Dielectrics." *Nature Materials* 8, 568-571 (2009).
Viventi, J., et al., "Flexible, Foldable, Actively Multiplexed, High-Density Electrode Array for Mapping Brain Activity in vivo." *Nat Neurosci.* 14, 1599-1605 (2011). 20 pages.
Vo, S., et al., "Sub-Wavelength Grating Lenses with a Twist." *IEEE Photonics Technology Letters* 26, 1375-1378 (2014).
Walia, S., et al. "Flexible Metasurfaces and Metamaterials: A Review of Materials and Fabrication Processes at Micro- and Nano-Scales." *Applied Physics Reviews* 2, 011303 (2015). 16 pages.
Wang, Q., et al., "Optically Reconfigurable Metasurfaces and Photonic Devices Based on Phase Change Materials." *Nature Photonics* 10, 60-65 (2016). 13 pages.
Wang, Y., et al., "Achromatic Fresnel Optics for Wideband Extreme-Ultraviolet and X-ray Imaging." *Nature* 424, 50-53 (2003).
Wang, C., et al., "User-Interactive Electronic Skin for Instantaneous Pressure Visualization." *Nature Materials* 12, 899-904 (2013). 23 pages.
Weingartner, I., et al., "Chromatic Correction of Two- and Three-Element Holographic Imaging Systems." *Optica Acta* 29, 519-529 (1982). 15 pages.
Xu, X., et al., "Flexible Visible-Infrared Metamaterials and Their Applications in Highly Sensitive Chemical and Biological Sensing." *Nano Letters* 11, 3232-3238 (2011).
Yao, Y., et al., "Electrically Tunable Metasurface Perfect Absorbers for Ultrathin Mid-Infrared Optical Modulators," *Nano Letters* 14, 6526-6532 (2014).
Yin, X., et al., "Photonic spin hall effect at metasurfaces." *Science* 339, 1405-1407 (2013).
Young, M. "Zone Plates and Their Aberrations." *Journal of the Optical Society of America* 62, 972-976 (1972).
Yu, N., et al., "Flat Optics with Designer Metasurfaces." *Nature Materials* 13, 139-150 (2014).
Zhao, Z., et al., "Multispectral Optical Metasurfaces Enabled by Achromatic Phase Transition." *Scientific Reports* 5, 15781 (2015). 9 pages.
Zheng, G., et al., "Metasurface Holograms Reaching 80% Efficiency." *Nature Nanotechnology* 10, 308-312 (2015). 6 pages.
Zhu, L., et al., "Flexible Photonic Metastructures for Tunable Coloration," *Optica* 2, 255-258 (2015).
International Search Report for PCT/US2016/027086 filed on Apr. 12, 2016 on behalf of California Institute of Technology, dated Jul. 20, 2016. 3 pages.

(56) References Cited

OTHER PUBLICATIONS

Written Opinion for PCT/US2016/027086 filed on Apr. 12, 2016 on behalf of California Institute of Technology, dated Jul. 20, 2016. 7 pages.
International Search Report for PCT/US2016/027154 filed on Apr. 12, 2016 on behalf of California Institute of Technology, dated Jul. 20, 2016. 4 pages.
Written Opinion for PCT/US2016/027154 filed on Apr. 12, 2016 on behalf of California Institute of Technology, dated Jul. 20, 2016. 5 pages.
International Search Report for PCT/US2016/047811 filed on Aug. 19, 2016 on behalf of California Institute of Technology, dated Oct. 31, 2016. 8 pages.
Written Opinion for PCT/US2016/047811 filed on Aug. 19, 2016 on behalf of California Institute of Technology, dated Oct. 31, 2016. 8 pages.
International Search Report for PCT/US2017/014197 filed on Jan. 19, 2017 on behalf of California Institute of Technology, dated Oct. 31, 2017. 5 pages.
Written Opinion for PCT/US2017/014197 filed on Jan. 19, 2017 on behalf of California Institute of Technology, dated Oct. 31, 2017. 6 pages.
Restriction Requirement for U.S. Appl. No. 15/097,101, filed Apr. 12, 2016 on behalf of California Institute of Technology, dated Aug. 17, 2017. 6 pages.
Notice of Allowance for U.S. Appl. No. 15/097,101, filed Apr. 12, 2016 on behalf of California Institute of Technology, dated Jan. 11, 2018. 11 pages.
Notice of Allowance for U.S. Appl. No. 15/097,101, filed Apr. 12, 2016 on behalf of California Institute of Technology, dated Apr. 20, 2018. 12 pages.
Non-Final Office Action for U.S. Appl. No. 15/241,914, filed Aug. 19, 2016 on behalf of California Institute of Technology, dated Dec. 13, 2017. 13 pages.
Final Office Action for U.S. Appl. No. 15/241,914, filed Aug. 19, 2016 on behalf of California Institute of Technology, dated May 1, 2018. 21 pages.
Final Office Action for U.S. Appl. No. 15/241,914, filed Aug. 19, 2016 on behalf of California Institute of Technology dated Jul. 24, 2019 23 pages.
Non-Final Office Action for U.S. Appl. No. 15/096,615, filed Apr. 12, 2016, on behalf of California Institute of Technology, dated Oct. 29, 2018. 16 pages.
Non-Final Office Action for U.S. Appl. No. 15/241,914, filed Aug. 19, 2016 on behalf of California Institute of Technology, dated Mar. 13, 2019. 26 pages.
Non-Final Office Action for U.S. Appl. No. 15/975,521, filed Apr. 12, 2016, on behalf of California Institute of Technology, dated Sep. 18, 2018. 10 pgs.
Notice of Allowance for U.S. Appl. No. 15/975,521, filed May 9, 2018, on behalf of California Institute of Technology, dated Jan. 22, 2019. 10 pages.
Restriction Requirement for U.S. Appl. No. 15/096,615, filed Apr. 12, 2016 on behalf of California Institute of Technology; dated May 30, 2018. 7 pages.
Arbabi, E., et al., "Dispersionless Optical Dielectric Metasurfaces," CIT-7418-P, 1-2. 2 pages.
Arbabi E., "Multi-wavelength Optical Dieletric Metasurfaces" CIT 7159-P 1-6. 2 pages.
Notice of Allowance for U.S. Appl. No. 15/096,615, filed Apr. 12, 2016, on behalf of California Institute of Technology, dated Feb. 13, 2019. 12 pages.
Staude et al. "Tailoring Directional Scattering through Magnetic and Electric REsonances in Subwavelength Silicon Nanodisks" *ACS Nano, American Chemical Society*.2013. pp. 7824-7832.vol. 7, No. 9. 9 pgs.
West et al. "All-dielectric subwavelength metasurface focusing lens" *Optics Express, The Optical Society*.Oct. 20, 2014. vol. 22, No. 21. 10 pgs.

\* cited by examiner

TUNABLE ELASTIC DIELECTRIC METASURFACE LENSES

CROSS REFERENCE TO RELATED APPLICATIONS

The present application claims priority to U.S. Provisional Patent Application No. 62/483,554, filed on Apr. 10, 2017, and may be related to U.S. patent application Ser. No. 15/410,735, filed on Jan. 19, 2017, the disclosures of both being incorporated herein by reference in their entirety.

STATEMENT OF INTEREST

This invention was made with government support under Grant No. W911NF-14-1-0345 awarded by the Army Research Office, under Grant No. DE-SC0001293/T-109438 awarded by the Department of Energy and Grant No. CBET1512266 awarded by the National Science Foundation. The government has certain rights in the invention.

TECHNICAL FIELD

The present disclosure relates to nanoengineered optical surfaces. More particularly, it relates to methods to tunable elastic dielectric metasurface lenses.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
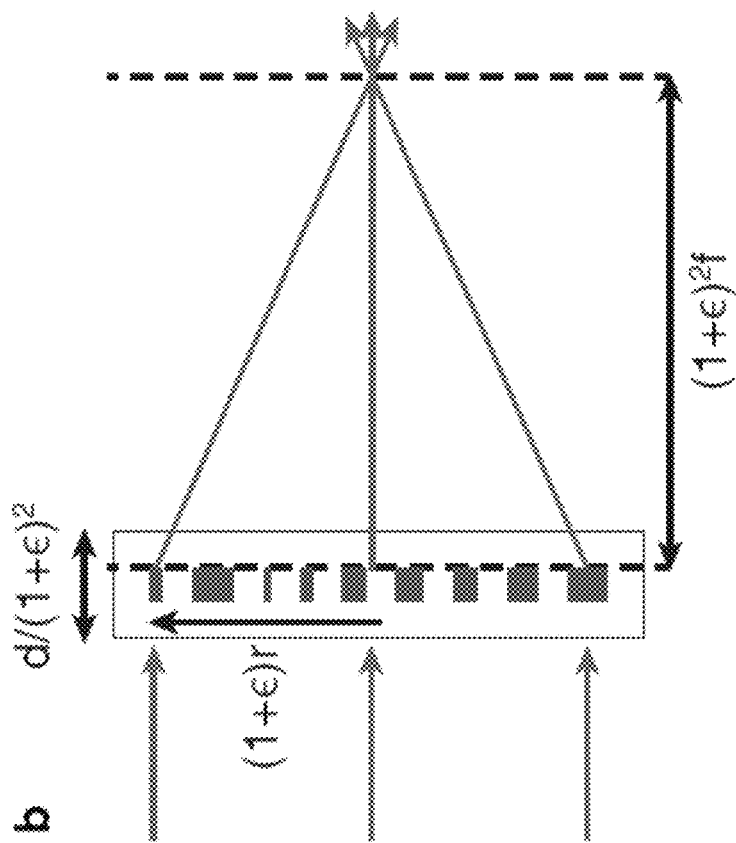
FIGS. 1 and 2 illustrate the principle of tunable elastic metasurface lenses.
Figure 1:
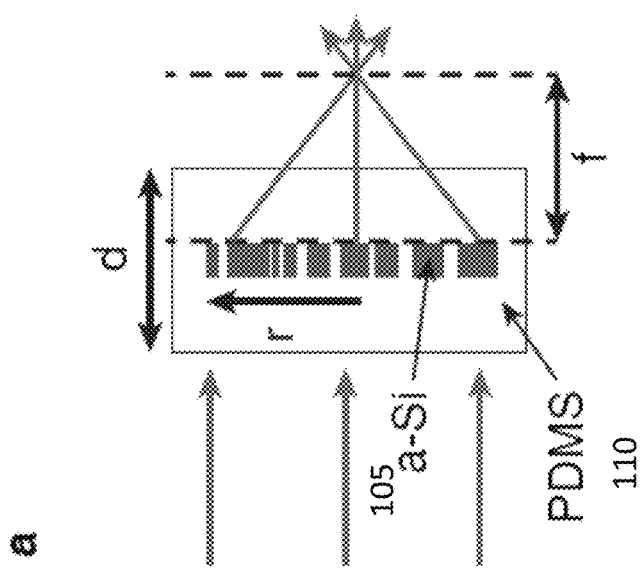

In a first aspect of the disclosure, a method is described, the method comprising: providing a metasurface lens having a focal length, the metasurface lens comprising: a plurality of dielectric scattering elements embedded in a flexible substrate, the plurality of dielectric scattering elements configured to control a phase and an amplitude of incident electromagnetic waves; and varying the focal length from a first focal length to a second focal length different from the first focal length, by applying a stretching force to the flexible substrate, thereby varying a spacing between adjacent scattering elements of the plurality of dielectric scattering elements.

In a second aspect of the disclosure, a method is described, the method comprising: fabricating an array of amorphous Si pillars on a sacrificial layer, wherein the sacrificial layer is on a substrate; coating a first polymer on the array of amorphous Si pillars, thereby encapsulating the array of amorphous Si pillars in the first polymer; etching the sacrificial layer, thereby releasing the encapsulated array of amorphous Si pillars from the substrate; and coating a second polymer on the encapsulated array of amorphous Si pillars.

DETAILED DESCRIPTION

The present disclosure describes dielectric metasurfaces. Dielectric metasurfaces are two-dimensional structures composed of nano-scatterers that manipulate the phase and polarization of optical waves with subwavelength spatial resolution, thus enabling ultra-thin components, for example for free-space optics. The present disclosure describes highly tunable dielectric metasurface devices based on subwavelength thick silicon nano-posts encapsulated in a thin transparent elastic polymer. An exemplary embodiment comprises a metasurface microlens operating at 915 nm, with focal distance tuning from 600 µm to 1400 µm (over 952 diopters change in optical power) through radial strain, while maintaining a diffraction-limited focus and a measured focusing efficiency above 50%. In other words, the metasurface can be stretched radially, for example along the radius if the metasurface has a circular cross section. The radial stretch can enable a uniform stretch in all lateral directions. The person of ordinary skill in the art will understand that the above numerical parameters may be varied in other embodiments, and are intended to exemplify the devices of the present disclosure. The tunable metasurfaces described herein are highly versatile for developing ultra-slim, multi-functional and tunable optical devices with widespread applications ranging from consumer electronics to medical devices and optical communications.

Metasurfaces are composed of a large number of discrete nano-scatterers. The nanoscatteres can be referred to as meta-atoms, as each nanoscatterer can be considered a scattering center as if it was an atom. The nanoscatterers locally modify phase and polarization of light with subwavelength spatial resolution. The meta-atoms can be defined lithographically, thus providing a way to mass-produce thin optical elements that could directly replace traditional bulk optical components or provide novel functionalities. For example, nanoposts may be fabricated on a rigid or flexible substrate, through known techniques of lithography, for example using masks and photoresists.

The two dimensional nature of metasurfaces, and their subwavelength thickness, render them suitable for fabricating tunable and reconfigurable optical elements. Some examples of possible applications of metasurfaces comprise: frequency response tuning using substrate deformation, refractive index tuning via thermo-optic effects, phase change materials, and electrically-driven carrier accumulation.

Stretchable substrates can also be used to fabricate metasurfaces, and demonstrate tunable diffractive and plasmonic metasurface components. The present disclosure describes mechanically tunable dielectric metasurfaces based on elastic substrates, simultaneously enabling a large tuning range, polarization independent operation, and high transmission.

As an exemplary embodiment, the present disclosure describes a microlens with over 130% focal distance tuning (from 600 µm to 1400 µm) while keeping high efficiency and diffraction limited focusing. The focal distance can be tuned by stretching the elastic substrate accordingly. For example, by stretching the elastic substrate by a set amount, the focal distance is tuned by a corresponding amount. In this way, the focal distance can be tuned to the desired value by stretching the substrate accordingly.

FIG. 1, panel a shows a schematic of a metasurface microlens encapsulated in an elastic substrate with radius r and focal distance f. For example, an amorphous Si metasurface (105) is embedded in a polydimethylsiloxane substrate (PDMS,110). The paraxial phase profile of the lens has the following form, and is drawn in FIG. 2 (205):

$$\phi(\rho, \lambda) \approx \frac{\pi \rho^2}{\lambda f}, \quad (1)$$

where $\rho$ is the distance to the center of the lens and $\lambda$ is the working wavelength.

Figure 2:
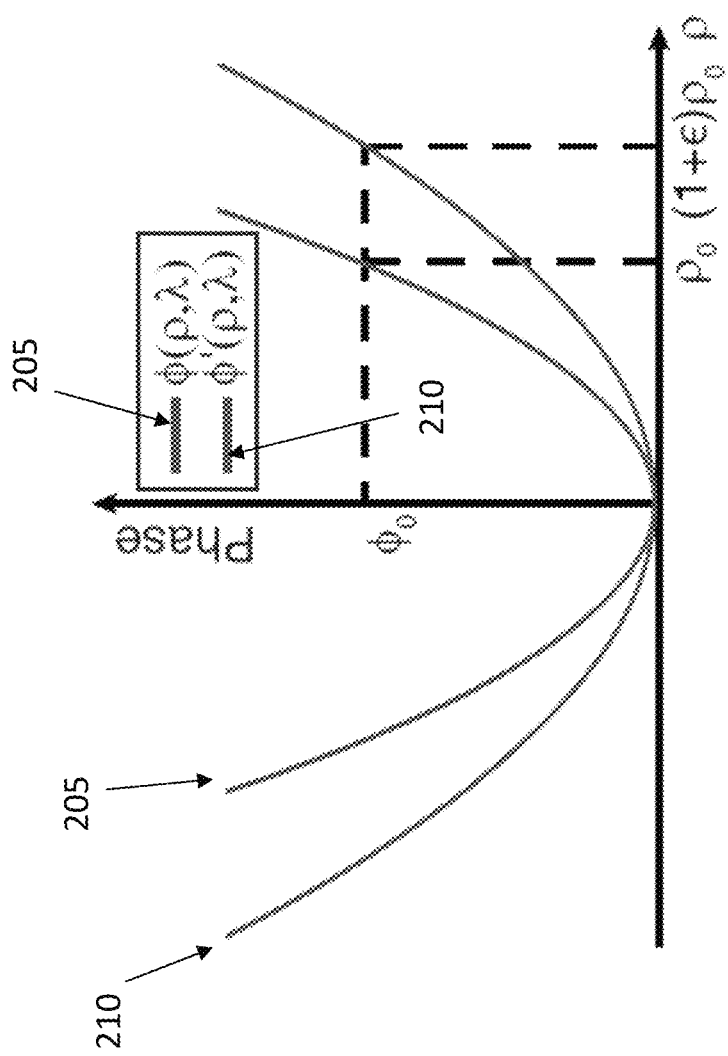

Uniformly stretching the substrate with a stretch ratio of $1+\varepsilon$, and assuming that the local phase transformation does not depend on the substrate deformation, the phase initially applied at radius $\rho$ is now applied at radius $\rho(1+\varepsilon)$; therefore, the under-strain phase profile becomes $\phi'(\rho, \lambda) = \pi\rho^2/(\lambda(1+\varepsilon)^2 f)$—as shown in FIG. 2 (210). This indicates that stretching the elastic metasurface microlens with a stretching ratio of $1+\varepsilon$ scales its focal length by a factor of $(1+\varepsilon)^2$, as shown schematically in FIG. 1, panel b, where the metasurface is visually stretched when compared to the metasurface illustrated in FIG. 1, panel a. The person of ordinary skill in the art will understand that $\varepsilon$ is, for example, a real number.

FIGS. 1 and 2 illustrate the principle of tunable elastic metasurface lenses. In panel a, FIG. 1 shows a side view schematic illustration of a dielectric metasurface microlens with focal distance f encapsulated in a low index elastic membrane. FIG. 1, panel b illustrates how, by stretching the metasurface microlens with a stretch ratio of $1+\varepsilon$, its focal distance changes by $(1+\varepsilon)^2$, providing a large tunability. The membrane thickness decreases according to its Poisson ratio (v), considered to be 0.5 here. FIG. 2 illustrates the phase of the metasurface microlens before (205) and after (210) stretching. As understood by the person of ordinary skill in the art, a-Si symbolizes amorphous silicon, while PDMS refers to polydimethylsiloxane.

In some embodiments, a metasurface can comprise dielectric meta-atoms with a high refractive index, placed on a subwavelength periodic lattice in a low refractive index medium. The building blocks of the metasurface can be amorphous silicon (a-Si) square cross-section nano-posts on a thin layer of aluminum oxide encapsulated in polydimethylsiloxane (PDMS) as a low index elastic membrane—FIG. 3 panel a, (305). In other embodiments, the nanoposts may have a different cross section other than square, for example a hexagonal cross section, or different materials may be used.

A characteristic of the metasurfaces described in the present disclosure, which differentiates them from Huygens' metasurfaces as described in Refs. [1-4], is the weak optical coupling between the nano-posts, which simplifies the metasurface design by allowing local sampling of the phase profile using different widths for the nano-posts placed on the vertices of a square lattice. The weak coupling between nanoposts is due to the high refractive index contrast between the nano-posts and the surrounding medium (such as PDMS), and is manifested in the high localization of energy density inside the nano-posts.

A consequence of the weak coupling is that the phase transformation mainly depends on the width of each nanopost and not on the distance between the nanoposts, leading to the same local phase shift, almost independent of the stretch factors of the substrate. In other words, as the flexible substrate is stretched, the width of the nanoposts remains the same, while the distance between nanoposts changes. Since the phase transformation depends mainly on the invariant width of the nanoposts, rather than on the variable distance between nanoposts, the optical response of the metasurface does not change. In this way, the metasurface maintains the same optical response while also having the advantage of a flexible substrate.

Figure 3:
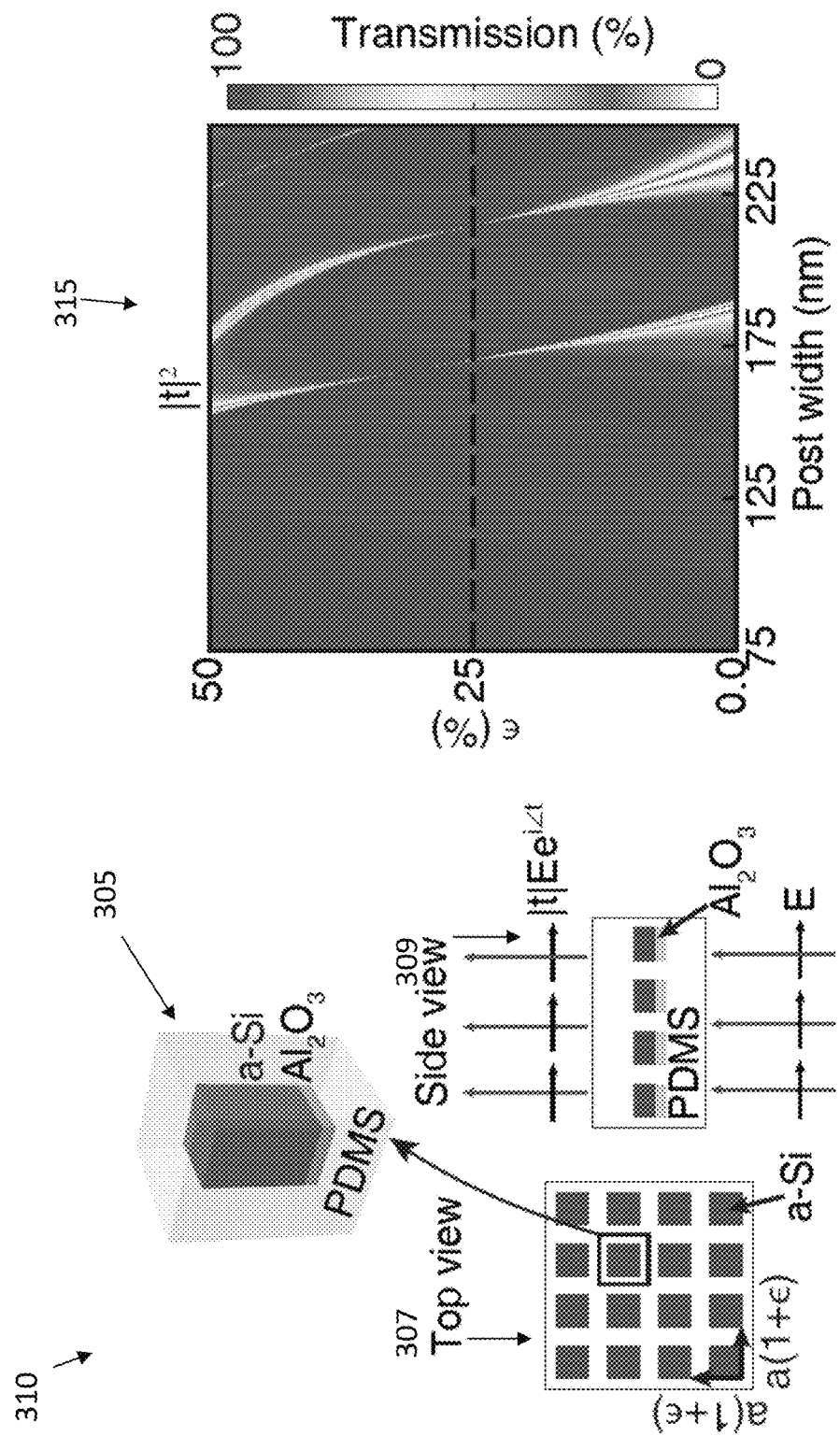
FIGS. 3-4 illustrate an exemplary metasurface and related optical data.
Figure 4:
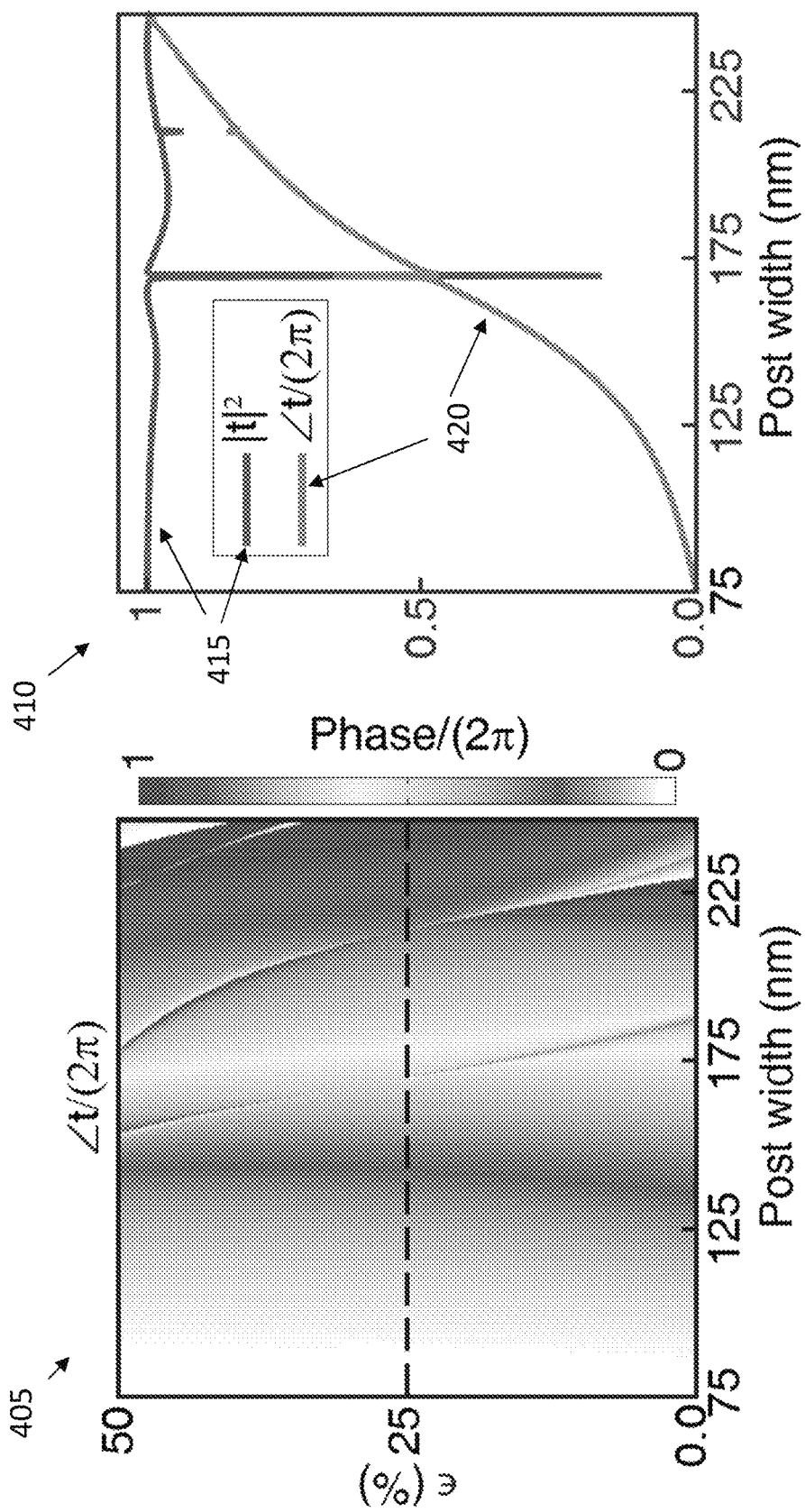

FIG. 3 (315) and FIG. 4 (405) illustrate the simulated transmittance and phase of the transmission coefficient for a periodic square lattice of encapsulated nano-posts in PDMS with strain values from 0% to 50%. The nano-posts, in this exemplary embodiment, are 690 nm tall, and the lattice constant at 0% strain is 380 nm. The nano-posts height can be chosen such that the whole phase range (0 to $2\pi$) is covered at all strains of interest by changing the nano-posts width, while keeping high transmission values. The lattice constant can be selected such that the lattice's thickness is subwavelength, that is less than the wavelength of incident radiation, and satisfies the Nyquist sampling criterion simultaneously for all strain values. The simulation results plotted in FIGS. 3-4 are obtained assuming normal incidence at the wavelength of 915 nm. The weak dependence of the transmission of the nano-post array on different strain values, which can be seen in FIG. 3 (315) and FIG. 4 (405) is further evidence for the weak coupling between the nano-posts.

Since the transmission coefficient is almost independent of the strain, it is possible to design the metasurface at one specific strain, since the optical transmission will be equivalent at other strains. FIG. 4 (410) shows the intensity (415) and phase (420) of the transmission coefficient at the middle strain value ($\varepsilon=25\%$) as a function of the nano-post width, that is used for designing the tunable metasurface. Considering the desired phase profile $\phi(\rho)$ at 25%, the corresponding nano-post width at each lattice site was found by minimizing the transmission error $\Delta T=|e^{i\phi}-|t|e^{i\angle t}|$, where t is the complex transmission coefficient. An aspheric phase profile is assumed as the desired phase profile. Minimizing $\Delta T$ at each lattice site results in selecting the nano-post with the closest complex transmission value to the desired one ($e^{i\phi}$) and automatically excludes the two high quality factor resonances observed in FIG. 4 (410) around 171 nm and 214 nm nano-post widths.

The nano-posts, in embodiments with a square cross-section, can be considered as truncated square cross-section waveguides with multiple low quality factor Fabry-Perot resonant modes. These multiple resonances are excited and contribute to the scattered field with various strengths, as can be seen in Ref. [5]. In addition, the high quality factor resonances observed in FIG. 4 (410) are formed because of the extended lattice modes of the periodic arrangement of the nano-posts. The total transmission of the nano-posts array is determined by the superposition of the scattered fields of these resonant modes and the incident light, which results in high transmittance and a full $2\pi$ range for the phase shift of the transmission coefficient.

In some embodiments, a tunable metasurface microlens is designed to operate at the wavelength of 915 nm. The microlens has a diameter of 200 µm under no strain, and its focal distance changes from 600 μm to more than 1400 μm (optical power from 1667 to 714 dioptres) when the strain value varies from 0% to 53%.

FIGS. 3-4 illustrate the design procedure of tunable metasurfaces according to some embodiments of the present disclosure. FIG. 3 (310) illustrates a schematic drawing of the top and side views of a uniform array of square cross-section nano-posts, arranged in a square lattice and encapsulated in PDMS. FIG. 3 (305) shows the building block of the array: an a-Si nano-post on a thin layer of aluminum oxide, embedded in PDMS. FIG. 3 (307) illustrates a top view of an exemplary array, while (309) illustrates a side view of the exemplary array. The person of ordinary skill in the art will understand that the polymer (for example PDMS) will stretch in response to an applied force. The a-Si nanoposts have a higher rigidity compared to PDMS, and will therefore not stretch to a significant degree. In other words, the nanoposts can be considered to have an invariant width, while the distance between nanoposts will vary according to the applied stretching force.

FIG. 3 (315) illustrates the simulated intensity for the array shown in (310) as a function of the nano-post width and the substrate strain. FIG. 4 (405) illustrates the simulated phase of the transmission coefficient for the array shown in (310) as a function of the nano-post width and the substrate strain. FIG. 4 (410) illustrates the simulated intensity and phase of the transmission coefficient for $\varepsilon=25\%$ used to map the transmission values to the nano-post widths. The values for (410) correspond to the dashed lines shown in (315) and (405). In this embodiment, the nano-posts are 690 nm tall, the aluminum oxide layer is about 100 nm thick, and the simulation wavelength is 915 nm.

Figure 5:
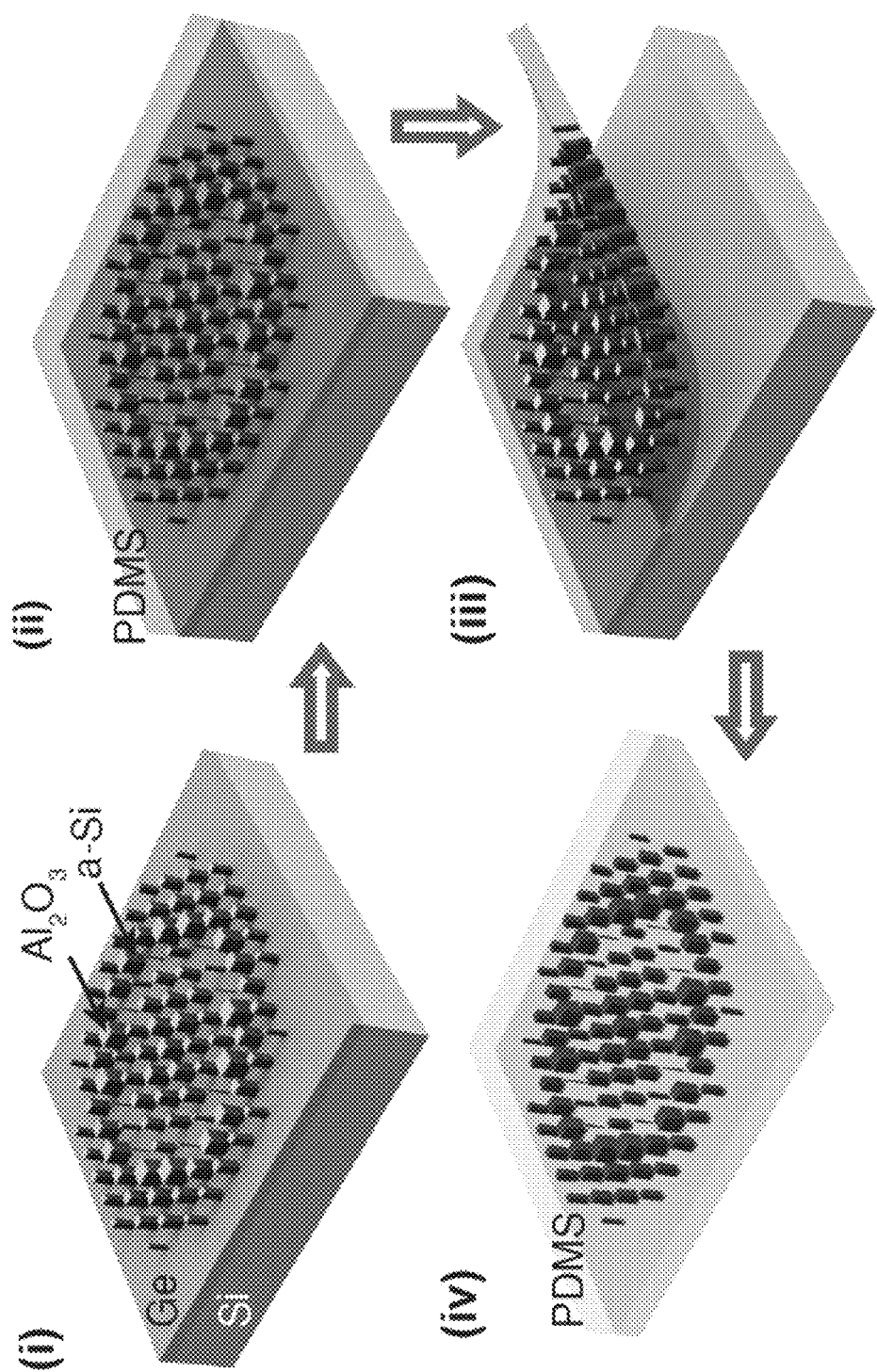
FIGS. 5-6 illustrate an overview of the fabrication steps and images of the metasurfaces at different steps.
Figure 6:
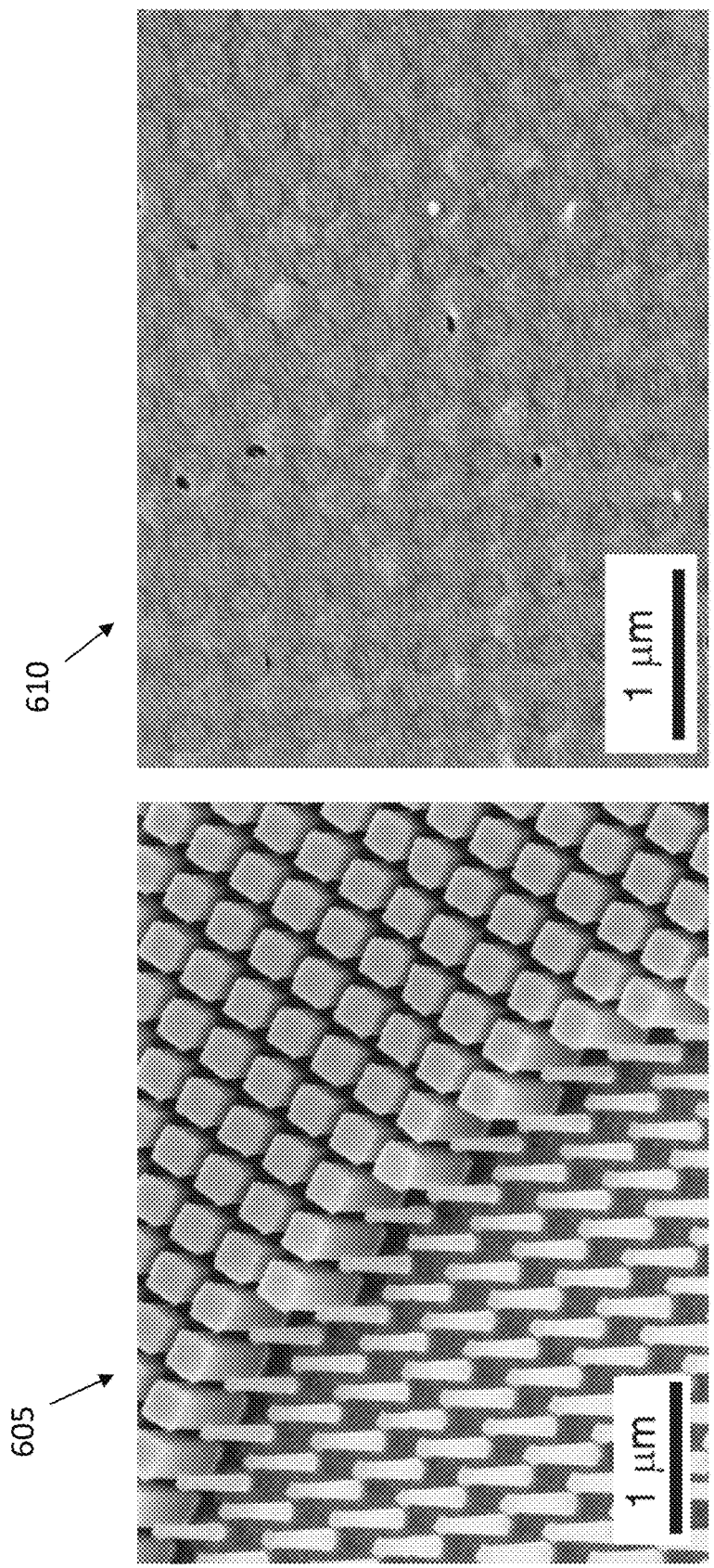

FIGS. 5-6 illustrate an overview of the fabrication steps and images of the metasurfaces at different steps. FIG. 5 illustrates the main steps involved in fabricating tunable metasurfaces: In panel (i) a-Si nano-posts are patterned and dry-etched using an aluminum oxide hard mask. In panel (i) the hard mask is still illustrated on top of the nanopillars, while the substrate has been etched away as it was not covered by the hard mask. In this exemplary fabrication process, the nano-posts rest on a germanium sacrificial layer on a silicon wafer. However, other fabrication processes may be used. In panel (ii), PDMS is spin coated on the metasurface structure. In panel (iii), the sacrificial germanium layer is dissolved to release the nano-posts which are now embedded in the flexible and stretchable PDMS layer. In panel (iv), a second PDMS layer is spin coated on the side containing the metasurface to provide a fully encapsulated microlens. In other words, the second polymer layer can be coated on the bottom surface where the substrate was previously located. In FIG. 5, the polymer layer, with embedded pillars, in panel (iii) is flipped over, and a second polymer is layer is deposited. Therefore, in panel (iv), the aluminum oxide layer that was visible at the top of the pillars in panel (iii) is not visible any longer, as it is on the bottom surface of the pillars in panel (iv). The same polymer, or a different polymer, may be used for the $2^{nd}$ polymer layer.

FIG. 6 (605) illustrates a scanning electron micrograph of the nano-posts before spin coating the first PDMS layer—as illustrated in panel (i) of FIG. 5. FIG. 6 (610) illustrates a scanning electron micrograph of the nano-posts embedded in PDMS—as illustrated in panel (iii) of FIG. 5. FIG. 6 (610) was taken at a tilt angle of 30 degrees. To dissipate the electric charge accumulated during scanning electron microscopy, a 20-nm-thick gold layer was deposited on the sample prior to imaging.

To calculate the transmittance and phase values plotted in FIGS. 5-6, a periodic array of square nano-posts on a square lattice was simulated at 915 nm with a normally incident plane wave using rigorous coupled wave analysis (RCWA). Refractive indices of 3.56 and 1.41 were used for a-Si and PDMS. The lattice constant was chosen to be 380 nm at 0% strain and linearly scaled with the stretch ratio. The lattice constant was chosen so that the array remains non-diffractive with enough sampling unit cells for reconstructing the wavefront at all the strain values of interest). The metasurface microlens was designed for the middle value strain (25% strain), for which the lattice constant is 475 nm. The lattice constant was then scaled down to 380 nm for device fabrication.

The intensity distributions were found by modeling the microlens as a phase mask. The transmission coefficient of the phase mask was calculated through interpolation of the complex transmission coefficients of the nano-posts. The effect of the strain was considered in both the position and the transmission coefficient of the nano-posts. A plane wave was used to illuminate the phase mask. The fields after the phase mask were propagated through the top PDMS layer (~50 μm thick at zero strain) and air to the focal plane and beyond using plane wave expansion technique. For efficiency calculations, a Gaussian beam with more than 99% of its power inside the device was used. The Gaussian beam radius was linearly scaled with the stretch ratio. Intensity profiles in the focal plane for different strain values were found using the same plane wave expansion technique. The focusing efficiencies were calculated by dividing the power passing through a disk around the focal point to the total incident power. The diameter of the disk for each strain value was set to be ~3 times the analytical full width half maximum (FWHM). In order to verify the accuracy of the described simulation method, a version of the actual device, but scaled to be four times smaller, was simulated. The device had a diameter of 50 μm, and 150 μm focal distance in the relaxed state, with the same NA, and was simulated at different strain values (0% to 50% with 10% steps) using the 3D finite difference time domain method. Intensity distributions and the focusing efficiencies were in good agreements with the described simulation method based on the plane wave expansion technique.

FIG. 5 schematically illustrates the key steps in fabricating a metasurface encapsulated in a thin elastic membrane. In this exemplary embodiment, a germanium sacrificial layer (~300 nm) was evaporated on a silicon wafer, followed by a 690-nm-thick hydrogenated PECVD (plasma enhanced chemical vapor deposition) a-Si layer (5% mixture of silane in argon at 200° C.). The refractive index of the a-Si layer was found to be 3.56 at the wavelength of 915 nm, using variable angle spectroscopic ellipsometry. An e-beam lithography system was used to define the pattern in ZEP-520A positive resist (~300 nm, spin coated at 5000 rpm for 1 min). A resist developer (ZED-N50 from Zeon Chemicals) was used to develop the pattern for 3 minutes. A ~100-nm-thick aluminum oxide layer was deposited on the sample by e-beam evaporation. The person of ordinary skill in the art will understand that thickness values, or other fabrication parameters, may be varied and different from the exemplary values above.

The pattern was then transferred into aluminum oxide by lifting off the resist. The patterned aluminum oxide hard mask was used for dry etching the a-Si layer in a mixture of $SF_6$ and $C_4F_8$ plasma—as illustrated in FIG. 5 panel (i). The PDMS (e.g., 10:1 mixing ratio of Sylgard™ 184 base and curing agent) was diluted in toluene in a 2:3 weight ratio as a thinner. The diluted PDMS mixture was spin coated (at 3000 rpm for 1 min) on the fabricated metasurface to fill the gaps between the nano-posts and to form a thin PDMS film. The sample was then degassed and cured at 80° C. for more than 30 mins. The second layer of PDMS without a thinner (~50 µm, spin coated at 1000 rpm for 1 min) was likewise degassed and cured at 80° C. for more than 1 hr—as illustrated in FIG. 5 panel (ii). The sample was then immersed in a 1:1:30 mixture of ammonium hydroxide, hydrogen peroxide, and DI water at room temperature to remove the sacrificial germanium layer and release the embedded nano-posts in the PDMS substrate—as illustrated in FIG. 5 panel (iii). Another layer of PDMS without a thinner was then spin coated on the microlens side of the sample (at 1000 rpm for 1 min) to fully encapsulate the nano-posts in PDMS—as illustrated in FIG. 5 panel (iv). The sample was again degassed and cured at 80° C. for more than 1 hr. The total PDMS thickness was ~100 µm. Encapsulation of the nano-posts in PDMS (or another polymer) is an important step in preserving the metasurface shape and minimizing defects when the device is highly strained. A scanning electron micrograph of the nano-posts on germanium layer before spin coating the first PDMS layer is shown in FIG. 6 (605). The nano-post transfer process has a near unity yield in retaining almost all the nano-posts at their positions. Void-free filling of the gaps between the nano-posts was confirmed by inspecting nano-posts embedded in PDMS before spin coating the PDMS cladding (610). In some embodiments, to compensate for systematic fabrication errors, an array of devices with all the nano-post widths biased uniformly in steps of 3 nm can be fabricated. The person of ordinary skill in the art will understand that thickness values, or other fabrication parameters, may be varied and different from the exemplary values above.

Figure 7:
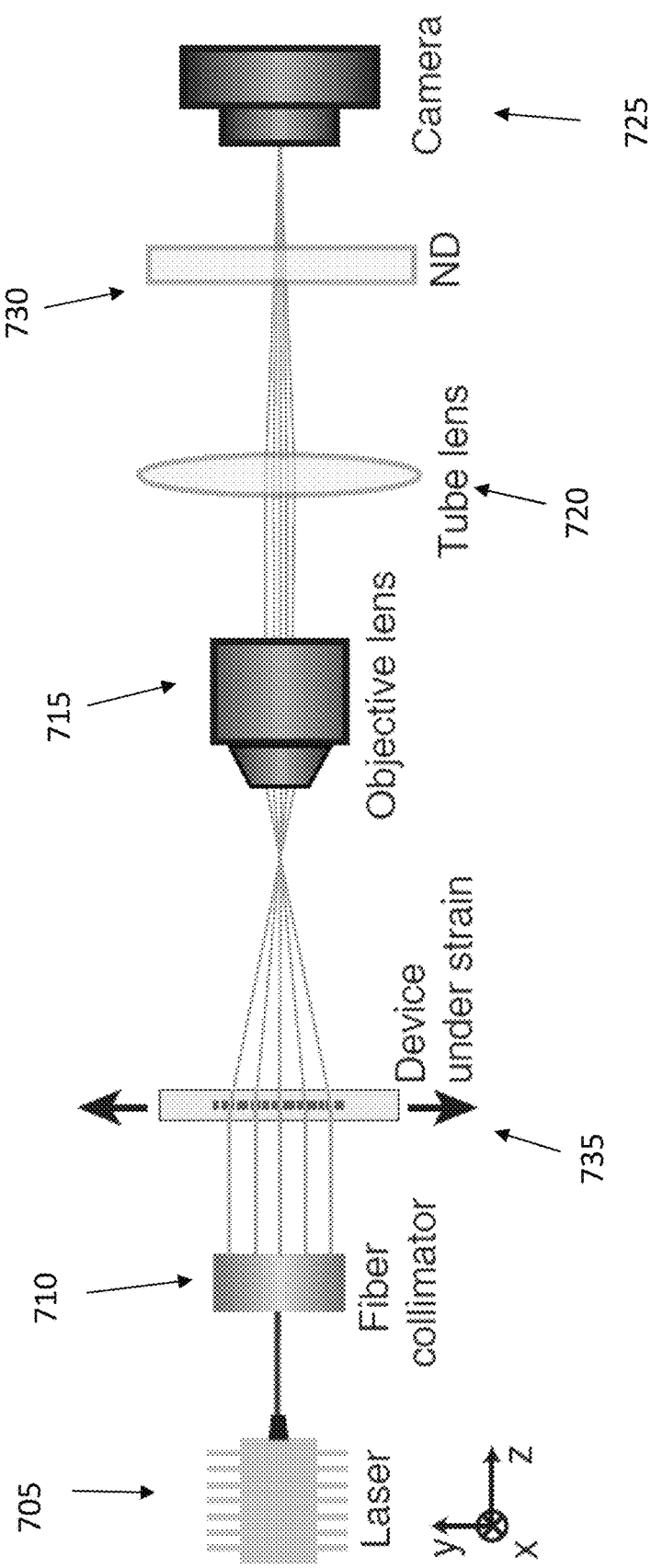
FIG. 7 illustrates an exemplary setup to measure the metasurfaces.

The device was measured using the setup shown schematically in FIG. 7. A 915 nm fiber coupled semiconductor laser (705) was used for illumination and a fiber collimation package (710) was used to collimate the incident beam. A 50× objective lens (715) and a tube lens (720) with a focal distance of 20 cm were used to image intensity at different planes to a camera (725). To adjust the light intensity and decrease the background noise captured by the camera, neutral density (ND,730) filters were used. A calibration sample (735) with known feature sizes was also imaged with the setup to find the overall magnification. The sample was first mounted on a glass substrate, for characterization under no strain.

The device with highest focusing efficiency (lowest systematic fabrication error) was found under no strain, because the measurement setup did not enable translational movement of devices under strain. The device was then manually clamped between two machined Teflon™ rings, for measurements under strain, so that the microlens of interest, with lowest systematic fabrication error, was placed near the center of the rings. Subsequently, the clamped sample mounted on a translation stage was pushed toward a machined Teflon™ tube, so that the microlens of interest would be stretched radially. To measure the focusing efficiencies under a specific strain, an additional lens with a focal length of 10 cm was used to partially focus the collimated beam. The beam radius was changed by adjusting the relative distance between the lens and the device under the test, so that more than 99% of the beam power would fall inside the device under the test.

A pinhole with a diameter ~3 times the measured FWHM was placed in the focal plane of the microlens to only let the light inside the pinhole pass through. This value was chosen because assuming a Gaussian beam profile, more than 99% of the beam power falls inside a pinhole with a diameter ~3 times the FWHM. The pinhole was fabricated by evaporating a thick layer of chrome on a fused silica substrate, and defining holes in it by wet etching. A power meter with a photodetector was used to measure efficiencies at 915 nm. The focusing efficiency was calculated as the ratio of the power in focus (measured optical power after the pinhole) to the incident power (measured power before the sample). The focusing efficiency at 15% strain was measured in this manner. Focusing efficiencies at other strains were calculated relative to the focusing efficiency at 15% strain in the following manner: in a first step, light intensity captured with the camera in the plane of focus was integrated inside a circle with a diameter ~3 times of the measured FWHM at each strain value including the 15% strain. Subsequently, the integrated power for each strain was divided by the integrated power at 15% strain. Additionally, the ratio of the input power at 15% strain to the input power at other strains was calculated (the input power of the beam hitting the device increases as the device area increases). The focusing efficiency at other strains was then found by multiplying these two normalization factors by the directly measured efficiency at 15% strain.

For characterization of the fabricated tunable metasurface microlens, a custom built microscope was used to image the transmitted light intensity at different distances from the metasurface (FIG. 7). The sample was mounted on a flat glass substrate and was characterized in the relaxed mode, and then it was clamped between two Teflon™ rings. A radial force was applied by pushing another Teflon™ tube from the backside and stretching the metasurface.

Figure 8:
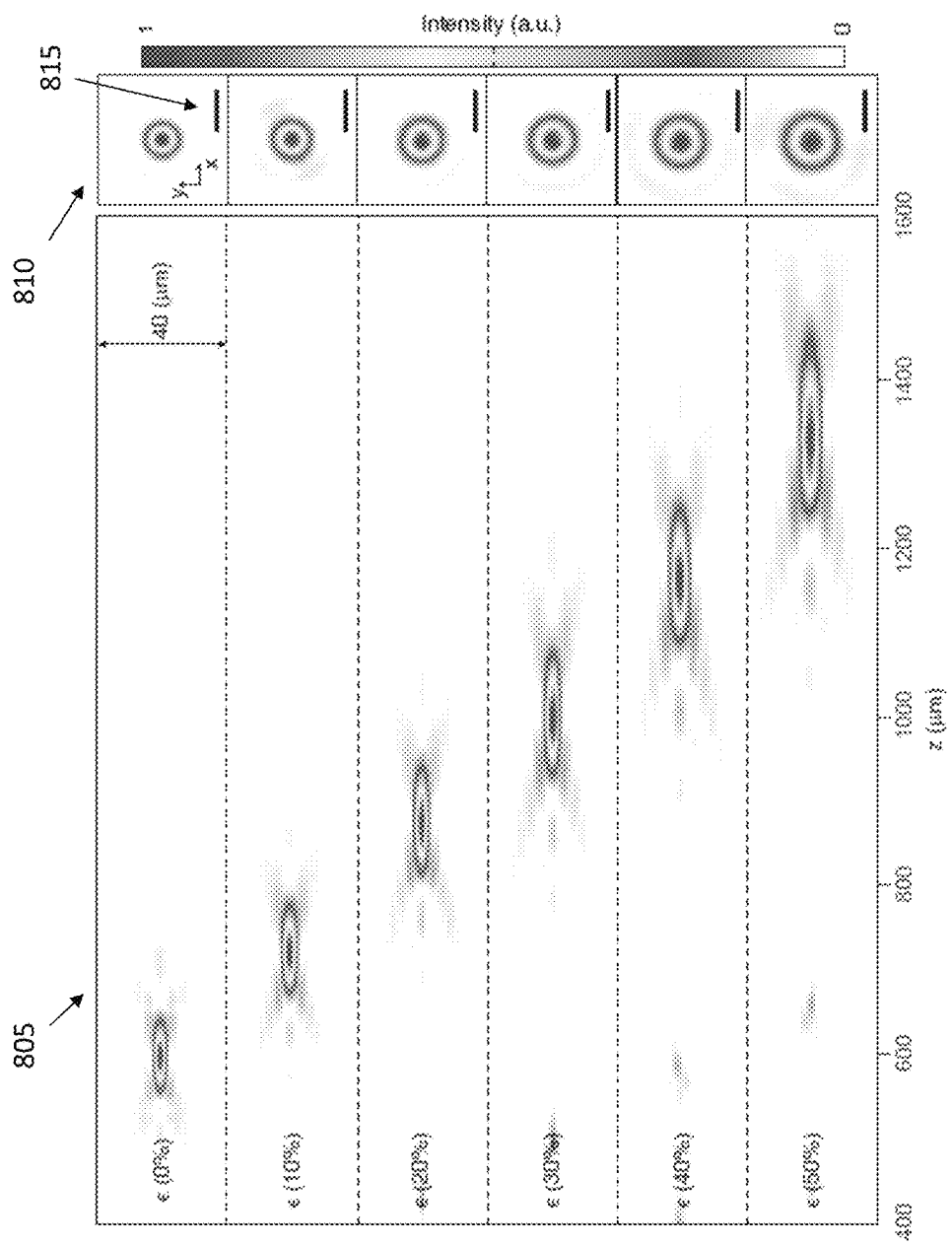
FIG. 8 plots measured optical intensities for the metasurfaces.

FIG. 8 plots measured optical intensities in the axial plane (805) and the focal plane (810) at 6 different strain values (0% to 50%). FIG. 8 shows a large focal distance tunability while keeping a nearly diffraction limited focus at all strains. For comparison, and to investigate the effect of the weak dependence of the transmission coefficients on the lattice size, the performance of the metasurface at different strains was simulated in two different cases.

In a first case, the actual intensity and phase of the transmission coefficients shown in FIGS. 3 (315) and 4 (405) was used. These coefficients take into account the effect of lattice constant changing with strain. In a second case, neglecting the strain dependence, the transmission coefficients calculated at 25% strain were used, as plotted in FIG. 4 (410), for all strain values. In both cases, the simulated intensity profiles and the corresponding focal distances and FWHMs are in good agreement with their measured counterparts. This confirms that the weak dependence on lattice constant does not affect the functionality and the diffraction limited performance of the device.

Figure 9:
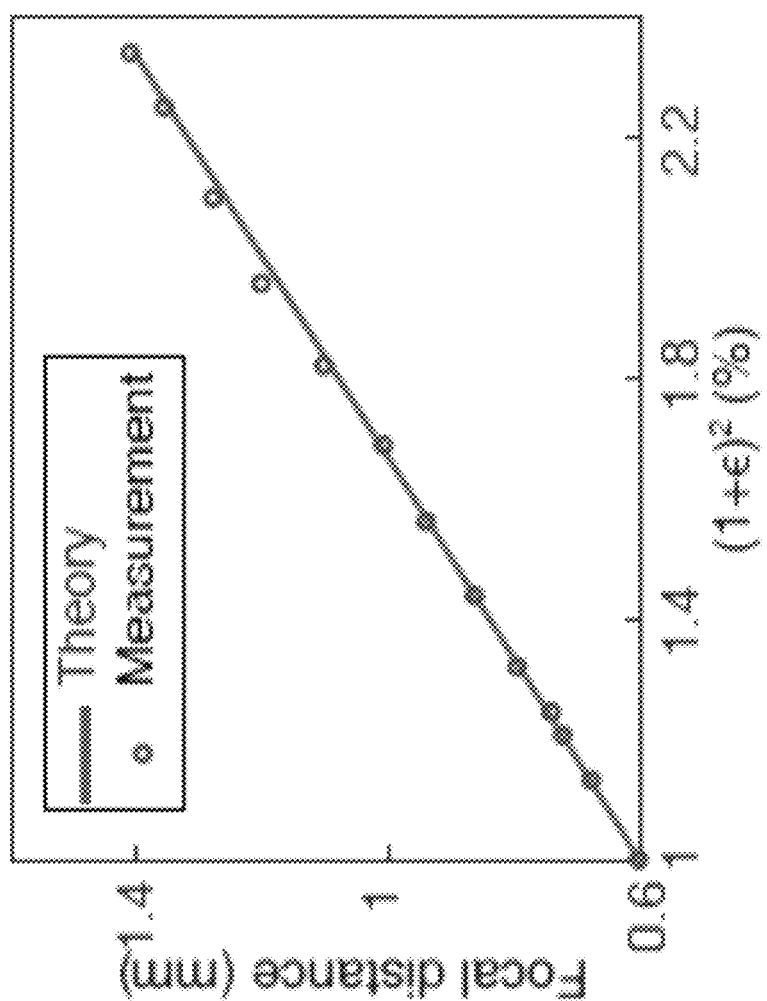
FIGS. 9-11 illustrate the optical performance of exemplary metasurfaces.
Figure 10:
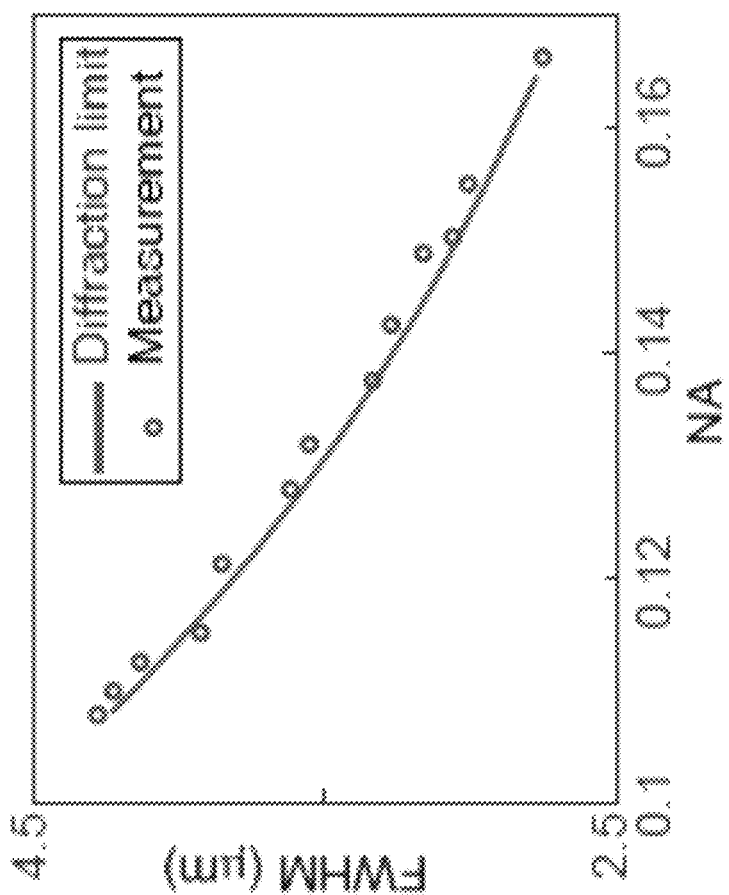

FIG. 9 shows a good agreement between the measured and the analytically predicted focal distances, which are plotted versus $(1+\varepsilon)^2$. Measured full width at half maximum (FWHM) of the focal spots for different strains and their corresponding diffraction limited values are shown in FIG. 10 as a function of the numerical aperture (NA) of the microlens. The results show nearly diffraction limited operation of the microlens under strain values up to above 50%. As expected, NA decreases and the focal spot enlarges as strain is increased.

FIG. 7 illustrates a schematic of the measurement setup: ND is a neutral density filter. FIG. 8 illustrates measured optical intensity profiles of a radially strained metasurface microlens ($\varepsilon$=0% to 50%) in the axial plane (805) and the focal plane (810). The scale bars (815) represent 5 µm. FIG.

Figure 11:
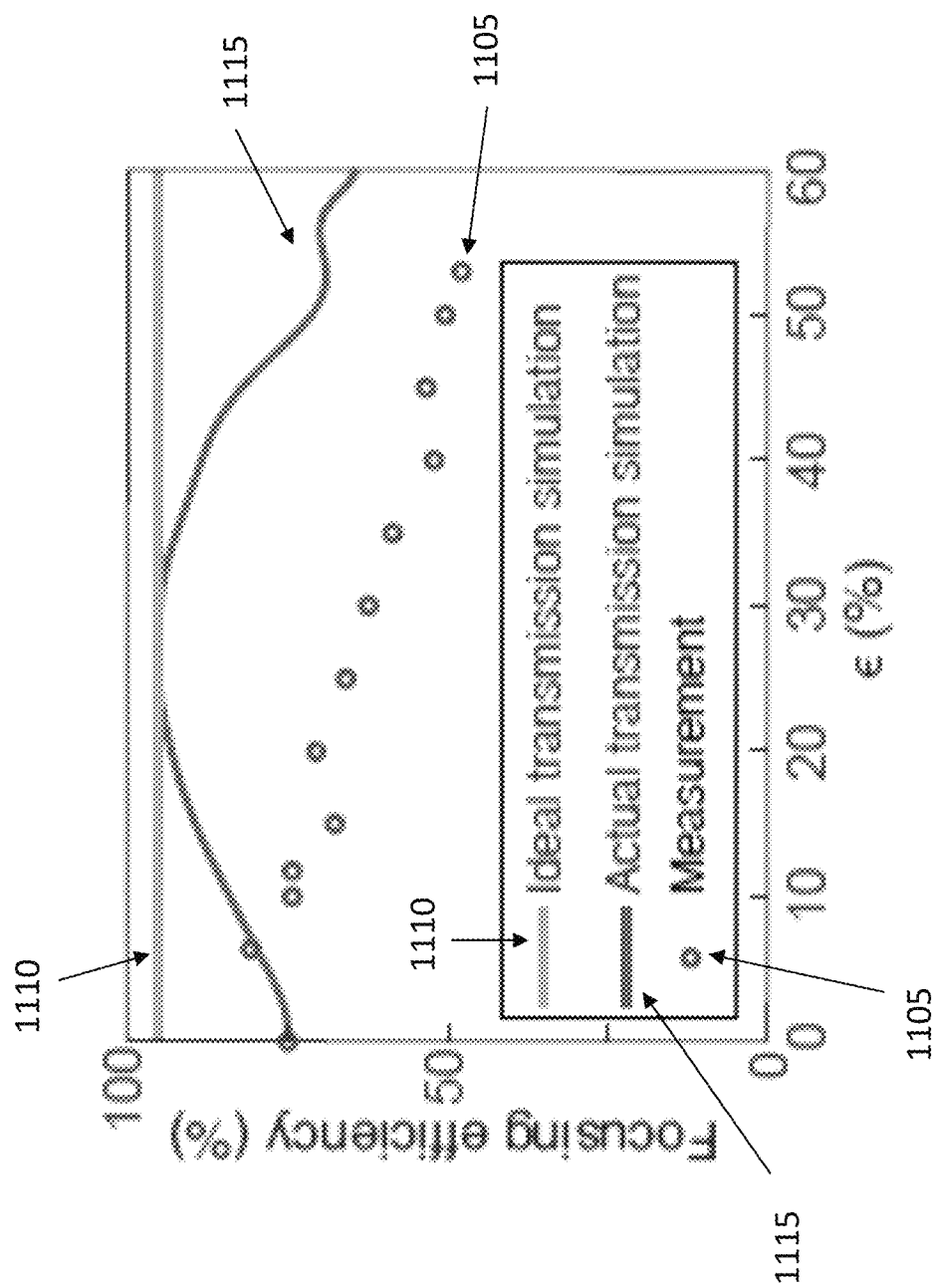

9 illustrates the measured and analytically predicted focal distances (i. e. $(1+\varepsilon)^2 f$) for different strain values versus square of the stretch ratio $((1+\varepsilon)^2)$. Focal distance is tuned from 600 μm to more than 1400 μm (more than 952 diopters change in optical power). FIG. 10 illustrates the measured, diffraction-limited full width at half maximum (FWHM) spot size in the focal plane for different strain values as a function of the numerical aperture (NA) of the microlens. FIG. 11 illustrates the measured efficiency (1105), and the two simulated focusing efficiencies as a function of strain: for the ideal transmission simulation (1110) and for the actual transmission simulation (1115). Measurements and simulations are performed at the wavelength of 915 nm.

The focusing efficiency is defined as the ratio of the optical power focused by the device to the incident power, and is measured and plotted in FIG. 11 for various strains. The measured 75% focusing efficiency in the relaxed state, shows the high optical quality of the device. The efficiency decreases gradually with increasing the strain. However, the efficiency remains above 50% for strain values up to 50%. To further understand the effect of the weak dependence of the transmission coefficients on the lattice strain, focusing efficiencies are calculated in two different cases considering and neglecting this dependence. In the first case, the actual transmission coefficients for each strain value was used, and in the second case the transmission coefficients calculated at 25% strain were used.

These two simulated focusing efficiencies are plotted in FIG. 11 along with the measured values. It can be observed that the small dependence of the transmission coefficients on strain results in a reduction of the focusing efficiency at strains other than the designed value. At small strains, the measured focusing efficiencies agree well with their simulated values, but the measured efficiencies are lower at large strain values. The lower measured efficiency can be attributed to possible mechanical deformations and misalignments of the nano-posts under strain, and the non-uniformity of the strain across the microlens. In addition, device characterizations were performed on the lens with the highest efficiency at 0% strain among the fabricated set (several lenses with all nano-post widths biased at different values were fabricated in order to compensate for the systematic fabrication errors). Therefore, the measured focusing efficiencies in the relaxed state and at small strains could be higher than the simulated values for the lens designed for optimal performance at 25% strain. The measured values are lower than the simulated focusing efficiencies obtained using ideal strain-independent transmission coefficients (FIG. 11).

The reliability of the tuning process was tested by measuring the focal spot and focusing efficiency of the tunable metasurface microlens after multiple straining cycles. No changes in the focusing efficiency and focal spot shape of the microlens were observed after more than 10 cycles of stretching and releasing the device.

The demonstrated metasurface lenses are transmissive over a broad wavelength range. Although such metasurfaces can suffer from chromatic aberrations similar to the other diffractive meta-lenses on rigid substrates, multiwavelength tunable operation can readily be achieved by combining the current platform with a multiwavelength metasurface as described herein.

Therefore, the present disclosure describes highly tunable dielectric metasurfaces based on elastic substrates. As an exemplary embodiment, a microlens with more than 952 diopters change in optical power was described in the present disclosure. However, other types of devices can also be fabricated, based on metasurfaces described herein. Such metasurfaces add tunability over a thin layer without increasing the complexity of the optical system. For instance, a metasurface can be integrated with a lithographically staked metasurface for correcting large angle aberrations (see Ref. [6]), to enable ultra-compact wide field adjustable NA tunable objectives. Tunable metasurfaces can also be fabricated on high speed electrically tunable elastomers in order to decrease their response time to less than a millisecond. Moreover, integration of the metasurfaces described herein with flexible and wearable electronics can also lead to versatile, tunable optoelectronic technologies.

Optical metasurfaces are structures with subwavelength thicknesses relative to the electromagnetic wavelength range the structures are meant to operate in. In other words, optical metasurfaces are thinner than a wavelength and can therefore shape the amplitude, phase, and polarization of electromagnetic beams. In the present disclosure, reference may be made to the visible light spectrum specifically, or to optical waves, however similar considerations can be valid also for electromagnetic waves outside the visible light spectrum.

Dielectric metasurfaces are, in some embodiments, arrays of dielectric scatterers placed on two dimensional lattices, the array having the capability to control the phase, amplitude, and polarization of light. In some embodiments, an array will comprise a large number of scatterers. The present disclosure describes a method for designing dispersionless metasurfaces that can maintain their functionality over a wide range, or bandwidth of light, or other electromagnetic waves. In some embodiments, the method disclosed herein is based on using meta-atoms that can cover multiple full $2\pi$ phase shifts with different dispersions. In other words, the meta-atoms have phases that change with different rates as the wavelength is varied. The meta-atoms may also be referred to as scatterers or scattering elements. The present disclosure also describes exemplary results for a corrected focusing metasurface mirror that shows a significant increase in the working bandwidth of the device, when compared to a normal metasurface focusing mirror as would be known in the prior art.

In some embodiments, the lateral dimension of the scattering elements is varied, while in other embodiments another geometrical dimension, such as the height, is varied instead. In other embodiments, both geometrical dimensions can be varied. In some embodiments, the methods comprise setting a desired phase and chromatic dispersion for a diffractive metasurface device having a desired functionality over a bandwidth of interest. The metasurface structures have been termed lenses in the present disclosure, however such structures can generally be referred to as metasurface devices, as different functionalities may be implemented.

In some embodiments, the dispersion of meta-atoms in a narrow bandwidth can be modeled using a linear dispersion approximation such as a linear Taylor expansion:

$$\phi(\lambda, r) \approx \phi(\lambda_0, r) + \frac{\partial \phi(\lambda, r)}{\partial \lambda}\bigg|_{\lambda=\lambda_0} (\lambda - \lambda_0)$$

where r is a geometric parameter, or a material parameter (or, alternatively, a set of parameters) that identifies the meta-atom.

In some embodiments, the nanopillars have a height in the nanometer range, for example between 1 and 900 nm, and a width between 1 and 900 nm. In some embodiments, the height of the pillars is between 400 and 800 nm, their width is between 50 and 400 nm, and the distance between pillars is between 100 and 600 nm. The dimensions of the pillars are subwavelength with respect to the operating wavelength of incident electromagnetic waves. In some embodiments, the nanopillars, or dielectric scatterers, are configured to control a phase and amplitude of incident electromagnetic waves. The flexible substrate is configured to stretch upon application of a force, for example a lateral force in the plane of the metasurface. The metasurface is configured to change a focal length upon stretching of the flexible substrate. In some embodiments, each pillar may have different dimensions than other pillars, according to the desired phase profile.

Figure 12:
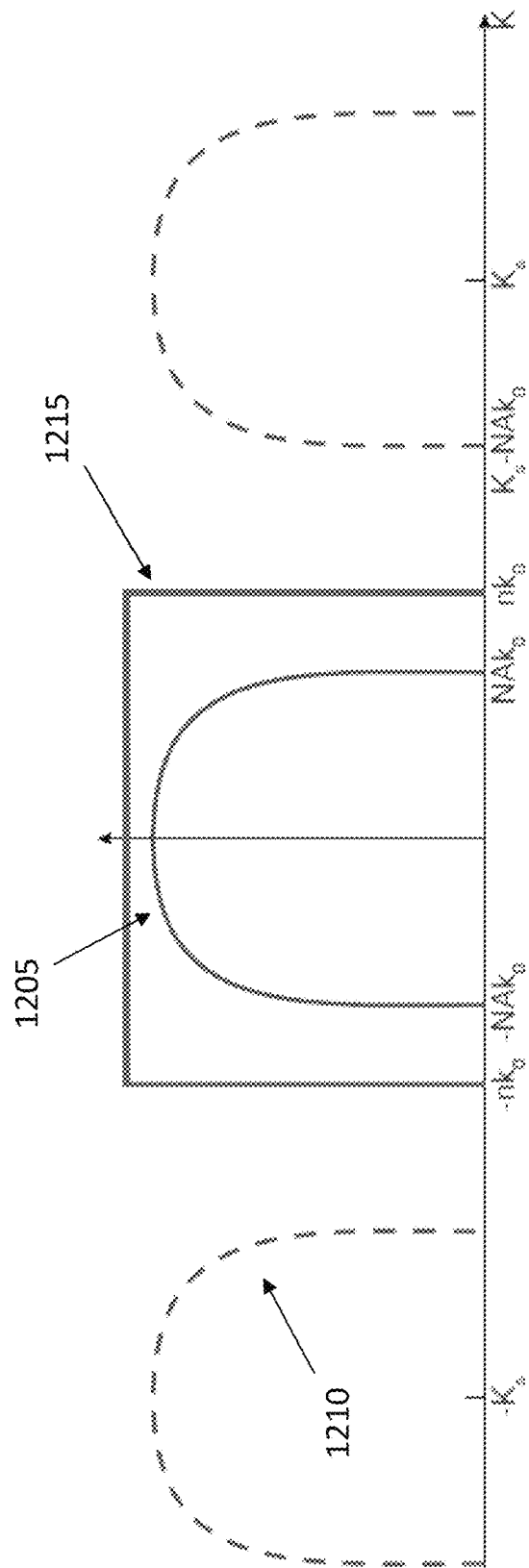
FIG. 12 illustrates a hypothetical one dimensional bandlimited spectrum.

In some embodiments, the lattice constant should be chosen such that the lattice remains non-diffractive and satisfies the Nyquist sampling criterion. From a signal processing point of view, the locally varying transmission coefficient of a flat microlens can be considered as a spatially band-limited signal with a $2NAk_0$ bandwidth (ignoring the effect of the edges), where NA is the microlens numerical aperture, and $k_0$ is the vacuum wavenumber. A hypothetical one dimensional band-limited spectrum is depicted in FIG. 12 (1205). By sampling the microlens phase profile with sampling frequency of $K_s$, the images (1210) are added to the spectrum. Therefore, for the perfect reconstruction of the microlens' transmission coefficient the Nyquist criterion should be satisfied: $K_s > 2NAk_0$. On the other hand the lattice should remain subwavelength; the higher order diffractions (1210) should remain non-propagating. Propagation in free space can be considered as a low pass filter with $2nk_0$ bandwidth (1215), where n is the the refractive index of the surrounding medium. Therefore, in order to have perfect reconstruction of phase and non-propagating higher order diffractions, the following relation should be satisfied:

$$K_s > nk_0 + NAk_0 \qquad (2)$$

It can be noted that the sampling frequency ($K_s$) is a reciprocal lattice vector. For the square lattice $K_s = 2\pi/\Lambda$, where $\Lambda$ is the lattice constant. Therefore Eq. (2) would be simplified as follows:

$$\Lambda < \frac{\lambda}{n + NA} \qquad (3)$$

where $\lambda$ is the free space wavelength. It can be noted that the maximum value of numerical aperture is $NA_{max} = n$, which simplifies Eq. (3) to $\Lambda < \lambda/(2n)$. For designing tunable microlenses, Eq. (3) should be satisfied for all the strains of interest, and $\Lambda = (1+\varepsilon)a$, where a is the lattice constant under strain. For the parameters used in the examples of the present disclosure, the unstrained lattice constant should be smaller than 401 nm in order to have tunable microlens up to 50% strains. In this example, the unstrained lattice constant was chosen to be 380 nm.

Figure 13:
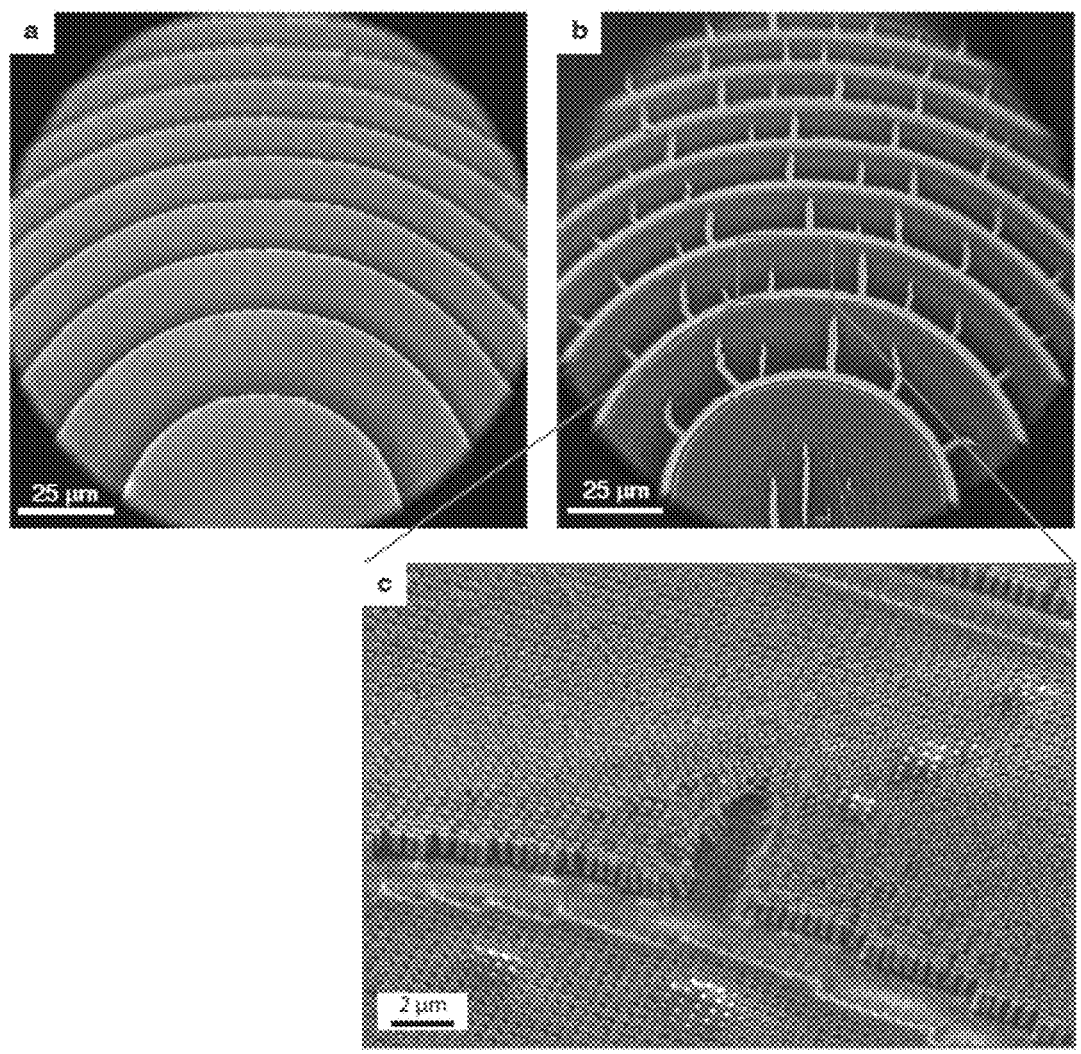
FIG. 13 illustrates optical images of the nano-posts in PDMS with and without the PDMS cladding.

FIG. 13 illustrates optical images of the nano-posts in PDMS with (panel a) and without the PDMS claddings (panel b) under ~50% radial strain. The images are taken using the same measurement setup shown in FIG. 7 under green laser illumination. Elastic metasurface without the PDMS cladding stretches non-uniformly, and some cracks are formed at the borders of the small and large nano-posts starting at ~25% strain. By increasing the strain, these cracks spread in the elastic metasurface and some of the nano-posts stick out of the PDMS. Panel c illustrates a scanning electron micrograph of the nano-posts without the PDMS cladding under ~50% radial strain, taken at a tilt angle of 30 degrees, as a zoomed-in detail of panel b. The metasurface microlens described in the present disclosure comprise a polymer (such as PDMS) cladding. The cladding completely encapsulates the nanopillars inside a thin PDMS layer. In this manner, the cracks do not show up between the nano-posts even at very high strains, as shown in panel a.

Figure 14:
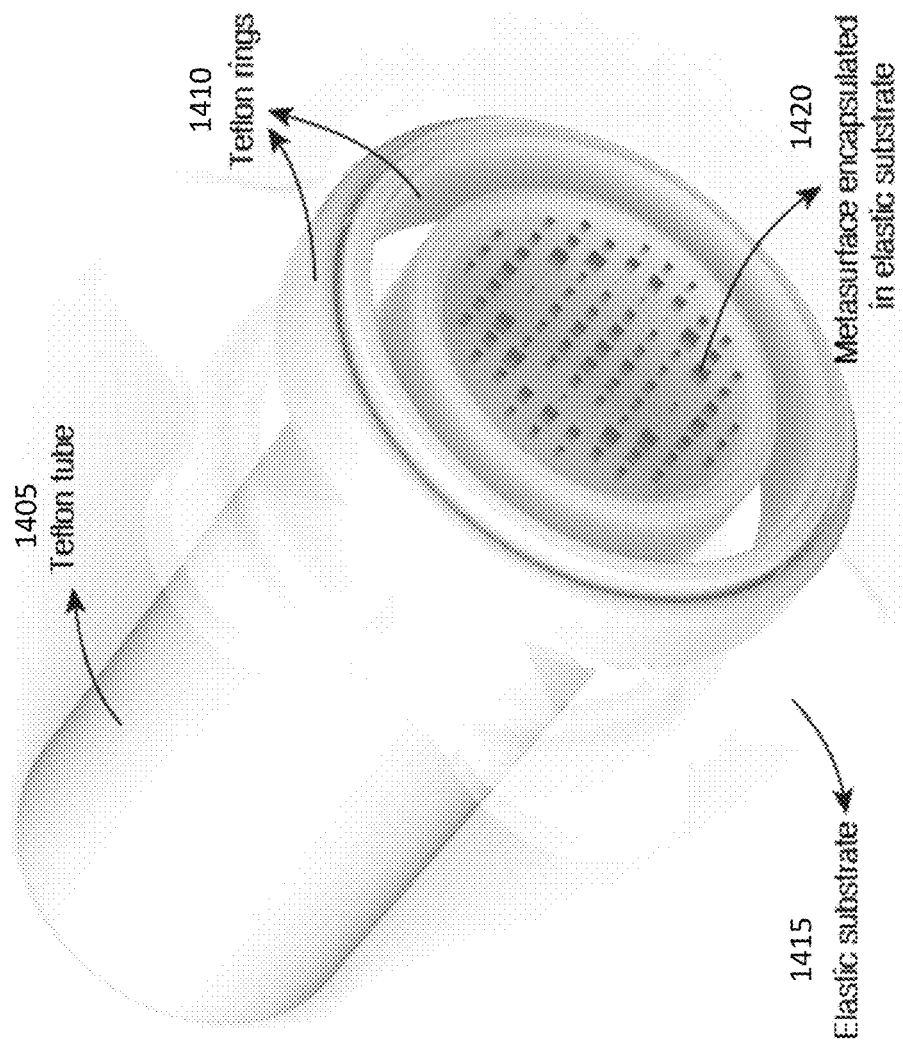
FIG. 14 illustrates a schematic illustration of the method used, in some embodiments, for radially stretching the elastic metasurface.

FIG. 14 illustrates a schematic illustration of the method used, in some embodiments, for radially stretching the elastic metasurface. The elastic metasurface is fixed between the Teflon™ rings and is stretched radially by pushing the Teflon™ tube against it from the backside. FIG. 14 illustrates a Teflon™ tube (1405), Teflon™ rings (1410), an elastic substrate (1415) and the metasurface lens (1420) encapsulated in the elastic substrate.

In some embodiments, varying a spacing between adjacent scattering elements of the plurality of dielectric scattering elements changes the focal length of the metasurface lens. In some embodiments, scattering elements of the metasurface may be different from other scattering elements, for example having a larger or smaller width or height. The different dimensions for the scattering elements can be seen, for example, in FIG. 14, where the metasurface (1420) comprises larger elements and smaller elements. The specific composition of the scattering elements, that is their spacing and dimensions, is determined according to the desired phase and amplitude profile, and the desired focal length at the operating wavelength.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] M. Decker, I. Staude, M. Falkner, J. Dominguez, D. N. Neshev, I. Brener, T. Pertsch, and Y. S. Kivsharl, Adv. Opt. Mater. 3, 813-820 (2015).

[2] Y. F. Yu, A. Y. Zhu, R. Paniagua-Domà-nguez, Y. H. Fu, B. Luk'yanchuk, and A. I. Kuznetsov, Laser Photon. Rev. 9, 412-418 (2015).

[3] K. E. Chong, I. Staude, A. James, J. Dominguez, S. Liu, S. Campione, G. S. Subramania, T. S. Luk, M. Decker, D. N. Neshev, I. Brener, and Y. S. Kivshar, Nano lett. 15, 5369-5374 (2015).

[4] P. Gutruf, C. Zou, W. Withayachumnankul, M. Bhaskaran, S. Sriram, and C. Fumeaux, ACS Nano. 10, 133-141 (2016).

[5] S. M. Kamali, A. Arbabi, E. Arbabi, Y. Horie, and A. Faraon, Nat. Commun. 7, 11618 (2016).

[6] A. Arbabi, E. Arbabi, S. M. Kamali, Y. Horie, and A. Faraon, arXiv:1604.06160 (2016).

What is claimed is:

1. A method comprising: providing a metasurface lens having a focal length, the metasurface lens comprising: a plurality of dielectric scattering elements embedded in a flexible substrate, the plurality of dielectric scattering elements configured to control a phase and an amplitude of incident electromagnetic waves; and varying the focal length from a first focal length to a second focal length different from the first focal length, by applying a radial stretching force to the flexible substrate, thereby varying a spacing between adjacent scattering elements of the plurality of dielectric scattering elements.

2. The method of claim 1, wherein the plurality of dielectric scattering elements have subwavelength dimensions.

3. The method of claim 2, wherein the plurality of dielectric scattering elements comprises an array of amorphous Si pillars.

4. The method of claim 3, wherein the flexible substrate is a transparent polymer.

5. The method of claim 4, wherein the transparent polymer is polydimethylsiloxane.

6. The method of claim 5, wherein the plurality of dielectric scattering elements further comprises a layer of aluminum oxide on a surface of each pillar of the array of amorphous Si pillars.

7. The method of claim 6, wherein the amorphous Si pillars have a square cross-section.

8. The method of claim 7, wherein a height of each pillar of the array of amorphous Si pillars is between 400 and 800 nm.

9. The method of claim 8, wherein a width of each pillar of the array of amorphous Si pillars is between 50 and 400 nm.

10. The method of claim 9, wherein the spacing is between 100 and 600 nm.

11. The method of claim 10, wherein the height is 690 nm.

12. The method of claim 11, wherein the spacing is 380 nm.

13. The method of claim 12, wherein the width is between 100 and 200 nm.

14. The method of claim 13, wherein the first focal length is 600 μm and the second focal length is 1400 μm.

15. The method of claim 13, wherein varying the focal length is between 600 μm and 1400 μm.

16. The method of claim 13, wherein the metasurface lens has a circular shape with a radius of 100 pm under no applied strain.

17. The method of claim 1, where applying a stretching force is with a stretching ratio of $1+\varepsilon$, and varying the focal length is by a factor of $(1+\varepsilon)^2$, where $\varepsilon$ is a real number.

* * * * *